United States Patent
Ishida et al.

(10) Patent No.: US 8,154,628 B2
(45) Date of Patent: Apr. 10, 2012

(54) IMAGE PROCESSING APPARATUS AND IMAGING APPARATUS AND METHOD

(75) Inventors: Kozo Ishida, Tokyo (JP); Tetsuya Kuno, Tokyo (JP); Takashi Itow, Tokyo (JP); Shotaro Moriya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 450 days.

(21) Appl. No.: 12/441,245

(22) PCT Filed: Aug. 14, 2007

(86) PCT No.: PCT/JP2007/065846
§ 371 (c)(1),
(2), (4) Date: Mar. 13, 2009

(87) PCT Pub. No.: WO2008/032517
PCT Pub. Date: Mar. 20, 2008

(65) Prior Publication Data
US 2010/0020205 A1    Jan. 28, 2010

(30) Foreign Application Priority Data

Sep. 14, 2006 (JP) .................. 2006-249281
Jan. 12, 2007 (JP) .................. 2007-004249

(51) Int. Cl.
*H04N 5/217* (2006.01)
*H04N 3/14* (2006.01)

(52) U.S. Cl. .................. 348/241; 348/299; 348/314

(58) Field of Classification Search .......... 348/241–243, 348/314, 299, 367
See application file for complete search history.

(56) References Cited

U.S. PATENT DOCUMENTS

| 5,712,682 | A | 1/1998 | Hannah |
| 6,111,607 | A | 8/2000 | Kameyama |
| 6,304,292 | B1 | 10/2001 | Ide et al. ............ 348/243 |
| 6,768,514 | B1 | 7/2004 | Tsuchiya et al. |
| 6,774,942 | B1 | 8/2004 | Salcedo et al. |
| 7,471,820 | B2 * | 12/2008 | Yeung et al. ........... 382/149 |
| 7,860,334 | B2 * | 12/2010 | Li et al. ............... 382/261 |
| 7,969,488 | B2 * | 6/2011 | Jerdev ................ 348/246 |

(Continued)

FOREIGN PATENT DOCUMENTS

JP    9-200605 A    7/1997

(Continued)

OTHER PUBLICATIONS

Rahman et al., "A Multiscale Retinex for Color Rendition and Dynamic Range Compression", Nov. 1996, XIX Proc. SPIE, vol. 2847, pp. 183-191.

(Continued)

*Primary Examiner* — Mohammed Hasan
(74) *Attorney, Agent, or Firm* — Birch, Stewart, Kolasch & Birch, LLP

(57) ABSTRACT

An image processing apparatus (5) that corrects an input image signal (Xin) pixel by pixel to generate a corrected image signal (Xout), having a filtering means (2) that determines a luminance distribution of a pixel to be corrected and pixels neighboring the pixel to be corrected, a correction gain calculation means (3) that determines the correction gain of the pixel to be corrected, and an operation means (4) that uses the correction gain determined by the correction gain calculation means to perform an operation on the input image signal pixel by pixel. With this simple configuration, the dynamic range of the input image can be appropriately improved.

5 Claims, 20 Drawing Sheets

U.S. PATENT DOCUMENTS

| | | |
|---|---|---|
| 2006/0140500 A1 | 6/2006 | Ozaki |
| 2008/0055430 A1* | 3/2008 | Kirsch .......................... 348/241 |

FOREIGN PATENT DOCUMENTS

| | | |
|---|---|---|
| JP | 10-336515 A | 12/1998 |
| JP | 2000-184272 A | 6/2000 |
| JP | 2002-27285 A | 1/2002 |
| JP | 2002-33956 A | 1/2002 |
| JP | 2003-46807 A | 2/2003 |
| JP | 2004-343177 A | 12/2004 |
| JP | 2004-363726 A | 12/2004 |
| JP | 2005-38119 A | 2/2005 |
| JP | 2006-121386 A | 5/2006 |
| WO | WO-2006/137216 A1 | 12/2006 |

OTHER PUBLICATIONS

European Search Report dated Jan. 30, 2012 for Application No. 07792489.2.

* cited by examiner

| Yavg/Ymax | Gmax | | | | |
|---|---|---|---|---|---|
| | 1.00 | 2.00 | 3.00 | 4.00 | 5.00 |
| 0.00 | 1.00 | 2.00 | 3.00 | 4.00 | 5.00 |
| 0.05 | 1.00 | 1.90 | 2.73 | 3.48 | 4.17 |
| 0.10 | 1.00 | 1.82 | 2.50 | 3.08 | 3.57 |
| 0.15 | 1.00 | 1.74 | 2.31 | 2.76 | 3.13 |
| 0.20 | 1.00 | 1.67 | 2.14 | 2.50 | 2.78 |
| 0.25 | 1.00 | 1.60 | 2.00 | 2.29 | 2.50 |
| 0.30 | 1.00 | 1.54 | 1.88 | 2.11 | 2.27 |
| 0.35 | 1.00 | 1.48 | 1.76 | 1.95 | 2.08 |
| 0.40 | 1.00 | 1.43 | 1.67 | 1.82 | 1.92 |
| 0.45 | 1.00 | 1.38 | 1.58 | 1.70 | 1.79 |
| 0.50 | 1.00 | 1.33 | 1.50 | 1.60 | 1.67 |
| 0.55 | 1.00 | 1.29 | 1.43 | 1.51 | 1.56 |
| 0.60 | 1.00 | 1.25 | 1.36 | 1.43 | 1.47 |
| 0.65 | 1.00 | 1.21 | 1.30 | 1.36 | 1.39 |
| 0.70 | 1.00 | 1.18 | 1.25 | 1.29 | 1.32 |
| 0.75 | 1.00 | 1.14 | 1.20 | 1.23 | 1.25 |
| 0.80 | 1.00 | 1.11 | 1.15 | 1.18 | 1.19 |
| 0.85 | 1.00 | 1.08 | 1.11 | 1.13 | 1.14 |
| 0.90 | 1.00 | 1.05 | 1.07 | 1.08 | 1.09 |
| 0.95 | 1.00 | 1.03 | 1.03 | 1.04 | 1.04 |
| 1.00 | 1.00 | 1.00 | 1.00 | 1.00 | 1.00 |

IMAGE PROCESSING APPARATUS AND IMAGING APPARATUS AND METHOD

FIELD OF THE INVENTION

The present invention relates to an image processing apparatus, image processing method, imaging apparatus, and imaging method that appropriately improve the dynamic range of an input image.

BACKGROUND ART

Histogram equalization, in which a histogram of the cumulative numbers of pixels having the same gradation value in a one-screen input image is constructed and the gradation scale is transformed to equalize the distribution, has been proposed (in Patent Document 1, for example) as a method of improving the gradation curve of an image.

The so-called retinex method, in which a weighted average of spatial luminance variations is calculated from an input image, the weighted average is converted to a logarithm, and an improved luminance signal is calculated from this logarithm and the logarithmic values of the input image, thereby improving the dynamic range of the image, has also been proposed (in Non-Patent Document 1 and Patent Document 2, for example).

Patent Document 1: Japanese Patent Application Publication No. 2002-27285 (paragraphs 0029-0041, FIG. 1)

Patent Document 1: Japanese Patent Application Publication No. 2005-38119 (paragraphs 0028-0031, FIG. 1)

Non-Patent Document: Z. Rahman et al., "A Multiscale Retinex for Color Rendition and Dynamic Range Compression", XIX Proc. SPIE, Vol. 2847, pp. 183-191, Nov. 1996

DISCLOSURE OF THE INVENTION

Problems to be Solved by the Invention

In the above histogram equalization method, however, the gradation curve is determined by recording the histogram data for at least one screen of the image input and analyzing the skew of the histogram from the recorded histogram data. There is, accordingly, a timing offset of at least one screen between the image used for analysis and the image to which the results of the analysis are applied, so there have been cases in which the dynamic range of the input image is not appropriately improved. In moving images, for example, there has been the problem that when the above timing offset of one screen or more occurs, because of the difference between the image used in the analysis and the image to which the result of the analysis is applied, the optimum gradation curve for the image to which the result of the analysis is applied cannot be determined.

A problem with the retinex method is that it involves complex computational processes such as convolution, due to the use of a weighed average and calculations of logarithms of the weighted average and the input signal, so if the retinex process is executed by hardware (for example, by an ASIC (application-specific integrated circuit) or FPGA (field programmable gate array)) or by an embedded microcontroller, the processing takes time and the implementation footprint (number of gates, memory capacity) is large.

The present invention addresses the above problems of the conventional art, with the object of providing an image processing apparatus, an image processing method, an imaging apparatus, and an imaging method that, with a simple structure, can appropriately improve the dynamic range of an input image.

Means of Solution of the Problems

The inventive image processing apparatus is an apparatus that corrects an input image signal pixel by pixel to generate a corrected image signal, and is characterized by having a filter means that determines and outputs a luminance distribution of a pixel to be corrected and pixels neighboring the pixel to be corrected, a correction gain calculation means that determines the correction gain of the pixel to be corrected, and an operation means that uses the correction gains determined by the correction gain calculation means to perform an operation on the input image signal pixel by pixel.

The invention also provides an imaging apparatus comprising:

an imaging signal generation means for receiving light from a subject and outputting a first imaging signal responsive to the light;

a gain correction means for correcting the first imaging signal pixel by pixel and outputting a corrected second imaging signal;

an exposure control means for determining a first exposure value of the imaging signal generation means that brings the average value of the first imaging signal into agreement with a prescribed target value, modifying the first exposure value according to a maximum value of a correction gain to obtain a second exposure value, and controlling exposure in the imaging signal generation means by the second exposure value; and a correction gain decision means for performing filtering on the value of each pixel and the values of its neighboring pixels in a luminance component of the first imaging signal, and determining the correction gain for each pixel from its filtered output and the maximum value of the correction gain; wherein the gain correction means performs the correction by an operation including multiplying the first imaging signal by the correction gain determined by the correction gain decision means.

Effect of the Invention

The present invention is able to correct the gradation curve of the input image appropriately because it calculates the correction gain of each pixel to be corrected from the luminance distribution of the neighboring pixels and uses this correction gain to correct the pixel to be corrected.

The present invention is also able to correct the gradation curve of the input image appropriately because it filters the values of each pixel and its neighboring pixels in the luminance component of the imaging signal, calculates the correction gain of each pixel from the filtered output, and uses this correction gain to correct each pixel in the imaging signal individually.

By correcting the exposure value according to the maximum value of the correction gain and controlling the exposure by the corrected exposure, the present invention can also improve the contrast of dark parts of the imaging signal without causing white collapse or reduced contrast in the bright parts.

Since the present invention requires no complex computations, the computational processing can be simplified, so the structure can be simplified and the cost can accordingly be reduced.

EXPLANATION OF REFERENCE CHARACTERS

1 luminance detection means, 2 filter means, 3 correction gain calculation means, 4 subtraction means, 5, 12 image processing means, 6 delay means, 7 coefficient means, 8 addition means, 9 offset detection means, 10 offset subtraction means, 11 offset addition means, 102 gain correction means, 103 luminance filter means, 104 correction gain calculation means, 105 imaging element, 106 analog signal processing means, 107 A/D conversion means, 108 camera signal processing means, 109 timing generation means, 110 exposure control means, 111 integration means, 113 maximum gain decision means, 114 imaging signal generation means, 115 correction gain decision means, 131 luminance operation means, 132 filter means.

BEST MODE OF PRACTICING THE INVENTION

Embodiment A1

Figure 1:
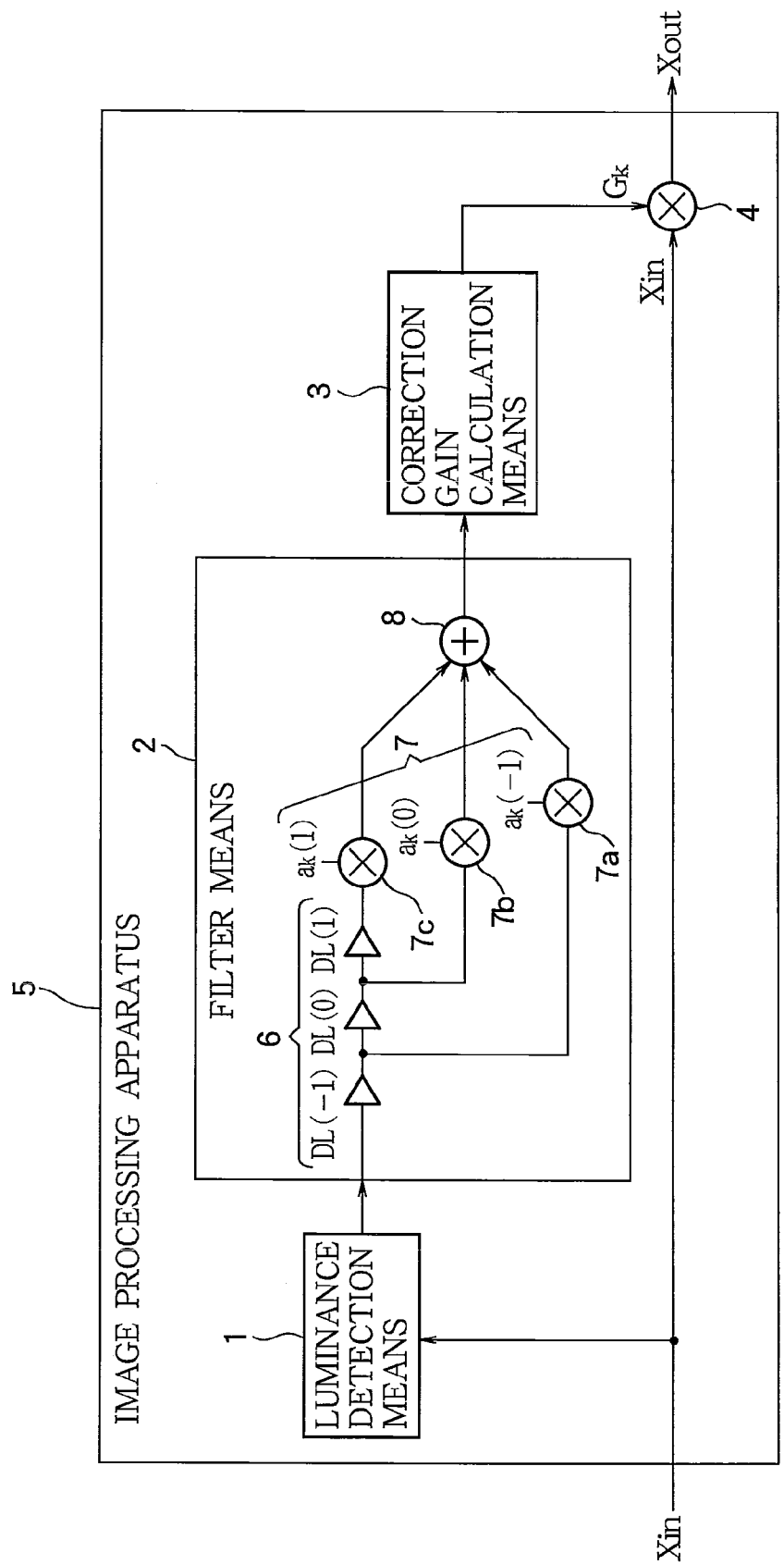
FIG. 1 is a schematic block diagram of an image processing apparatus according to Embodiment A1 of the invention (an apparatus for implementing an image processing method according to Embodiment A1).

FIG. 1 is a schematic block diagram of an image processing apparatus 5 according to Embodiment A1 of the invention (an apparatus for implementing an image processing method according to Embodiment A1). As shown in FIG. 1, the image processing apparatus 5 according to Embodiment A1 has a luminance detection means 1, a filter means 2, a correction gain calculation means 3, and an operation means 4. Structures described as 'means' in the present application may comprise hardware such as electrical circuits, software operating according to a program, or a combination of hardware and software. For example, the luminance detection means 1, filter means 2, correction gain calculation means 3, and operation means 4 may be implemented by software by using a microcontroller (not shown).

The image processing apparatus 5 according to Embodiment A1 calculates, from an input image signal Xin, a correction gain $G_k$ for each pixel, uses the calculated correction gain $G_k$ to perform a correction process for each pixel of the input image signal Xin, and generates a corrected image signal Xout. The correction process performed by the image processing apparatus 5 improves, for example, the dynamic range of an imaging signal imaged by use of a solid-state imaging element. This correction process can improve the contrast of low-brightness areas on the imaged screen, which were conventionally apt to experience black collapse, and can improve visibility performance and imaging performance.

The input image signal Xin is, for example, a three-color image signal (referred to below as an RGB signal) having red (R), green (G), and blue (B) components arranged in a two-dimensional 640 (horizontal)×480 (vertical) pixel matrix with an eight-bit gradation scale. The R signal level of the input image signal Xin is expressed by R(M, N); similarly, the G signal level is expressed by G(M, N), and the B signal level is expressed by B(M, N), where M indicates horizontal pixel position and N indicates vertical pixel position.

The input image signal Xin is not limited to an RGB signal; it may be a YCbCr signal, an L*a*b* signal, or an HSV (hue, saturation, value) signal. When a YCbCr signal or an HSV signal is used as the input image signal Xin, the image processing apparatus 5 includes a color conversion means (not shown) for color conversion of signals in these color spaces to RGB signals. The gradation scale of the input image signal Xin is not limited to the above eight-bit scale; other scales may be used, such as the ten-bit or twelve-bit scale employed for still image files. The number of pixels is not limited to the values given; other values, such as 1024 (horizontal)×960 (vertical) pixels, may be used.

The luminance detection means 1 determines and outputs the luminance signal component from the input image signal Xin. In the ITU-R BT.709 standard, the luminance signal Y can be obtained from the RGB signal by the following equation (A1).

$$Y=0.299 \times R(M,N)+0.587 \times G(M,N)+0.114 \times B(M,N) \quad (A1)$$

The conversion formula for obtaining the luminance signal Y from the RGB signal is determined by the standard of the color space used by the system in which the image processing is performed, and is not limited to the above equation (A1). If the input image signal Xin includes a luminance signal Y, the luminance detection means 1 does not carry out a calculation to obtain the luminance signal Y but simply extracts the luminance signal Y from the input image signal Xin and outputs it to the filter means 2.

The filter means 2 is a one-dimensional n-tap finite impulse response digital filter having a delay means 6, a coefficient means 7, and an addition means 8. The delay means 6 has a delay element DL(−1) that delays the luminance signal of the input image signal Xin, a delay element DL(0) that delays the output of the delay element DL(−1), and a delay element DL(1) that delays the output of the delay element DL(0). The coefficient means 7 has a multiplier 7a that multiplies the output of delay element DL(−1) by a coefficient $a_k(-1)$, a multiplier 7b that multiplies the output of delay element DL(0) by a coefficient $a_k(0)$, and a multiplier 7c that multiplies the output of delay element DL(1) by a coefficient $a_k(1)$. The tap count n satisfies the condition n=2×k+1 (where k is a positive integer).

The filter means 2 carries out a filtering process on the luminance signal Y output from the luminance detection means 1 and, after the filtering process, outputs a filtered signal. FIG. 1 shows a case in which the tap count n is three. The filtered signal output from the filter means 2 is, for example, an average luminance Yavg which may be obtained from the following equation (A2).

$$Yavg = \frac{a_k(-1) \times Y(-1) + a_k(0) \times Y(0) + a_k(1) \times Y(1)}{\sum_{t=-1}^{1} a_k(t)} \quad (A2)$$

In equation (A2), Y(−1), Y(0), and Y(1) respectively indicate the luminance signals of the pixel one pixel before the pixel to be corrected, the pixel to be corrected, and the pixel one pixel after the pixel to be corrected. If the coefficients $a_k(-1)$, $a_k(0)$, and $a_k(1)$ are all one ($a_k(-1)=a_k(0)=a_k(1)=1$), the denominator in equation (A2) is given by the following equation (A2a), and equation (A2) represents the calculation of a simple mean value.

$$\sum_{t=-1}^{1} a_k(t) = a_k(-1) + a_k(0) + a_k(1) = 3 \quad (A2a)$$

Therefore, the average luminance of the pixel to be corrected and its neighboring pixels can be determined by equation (A2). The pixels neighboring the pixel to be corrected include, if i is a given integer, pixels from the pixel i pixels before the pixel to be corrected to the pixel one pixel before the pixel to be corrected, and pixels from the pixel one pixel after the pixel to be corrected to the pixel i pixels after the pixel to be corrected. If the integer i is one, the pixels neighboring the pixel to be corrected are the pixel one pixel before the pixel to be corrected and the pixel one pixel after the pixel to be corrected.

As described above, the filter output of the luminance detection means 1 in a one-dimensional direction of the luminance signal Y can be determined by use of a one-dimensional finite impulse response digital filter configuration. By configuring the filter to calculate the mean value of the luminance signal Y and the pixels neighboring the pixel to be corrected, it is possible to determine changes in the brightness distribution in the one-dimensional direction. Accordingly, correction gains corresponding to the changes in the brightness distribution can be found and the signal contrast can be corrected according to the changes in brightness distribution. This configuration, which is common in digital signal processing circuits, can reduce circuit size, number of gates, and cost.

The tap count n is not limited to three but may have any value. Increasing the tap count n enables fine-tuned setting of cut-off frequency characteristics and detection of gradual luminance changes over a wide range. Switching the tap count n in this way allows an optimal filter means 2 to be configured according to changes in luminance distribution due to different lighting conditions in the input image.

The above description assumes that the filter means 2 is a one-dimensional finite impulse response digital filter, but the filter means 2 may be a two-dimensional finite impulse response digital filter. Using a two-dimensional finite impulse response digital filter enables detection of regional luminance changes in the input image.

The filter means 2 need not necessarily be configured to calculate the average luminance Yavg using the above equation (A2); it may have any configuration that enables changes in the brightness distribution to be determined, so it may be configured to output weighted average values or may be configured using a low-pass filter or a bandpass filter.

Next, the correction gain calculation means 3 calculates and outputs a correction gain $G_k$ based on the average luminance Yavg, which is the filtered signal output from the filter means 2. The process by which the correction gain $G_k$ is calculated will be described in detail later.

The operation means 4 receives the correction gain $G_k$ output from the correction gain calculation means 3, multiplies the input image signal Xin by the correction gain $G_k$, and outputs the product.

Figure 2:
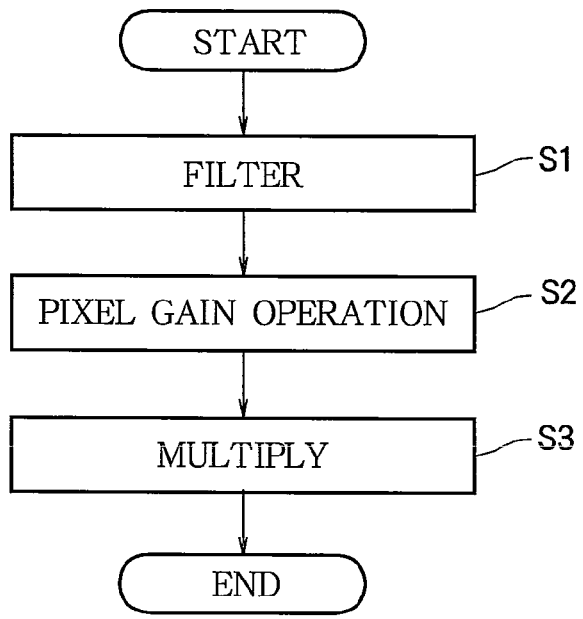
FIG. 2 is a flowchart schematically illustrating the operation of the image processing apparatus according to Embodiment A1.

FIG. 2 is a flowchart schematically illustrating the operation of the image processing apparatus 5 according to Embodiment A1 (the image processing method according to Embodiment A1). As shown in FIG. 2, the image processing apparatus 5 according to Embodiment A1 carries out a filtering process (step S1), a correction gain detection process (step S2) which is a process of calculating a correction gain for each pixel (a correction gain calculation process), and an operation process (step S3) which is a process of using the correction gain to correct the input image signal. In the filtering process (step S1), the filter means 2 performs a filtering process on the average luminance Yavg of the input image signal Xin, and outputs a filter-processed luminance signal. In the following correction gain detection process (step S2), the correction gain $G_k$ of each pixel is obtained responsive to the output from the filter means 2. In the correction gain operation step (step S3), the operation means 4 uses the correction gain $G_k$ obtained by the correction gain detection process (step S2) to perform an operation on the input image signal Xin pixel by pixel, and output the corrected image signal Xout.

The operation of the correction gain calculation means 3 and the operation means 4 will now be described in detail. The correction gain calculation means 3 calculates the correction gain $G_k$ from, for example, the following equation (A3).

$$G_k = \frac{Gmax}{1 + (Gmax - 1) \times \frac{Yavg}{Ymax}} \quad (A3)$$

In equation (A3), Yavg indicates the average luminance output from the filter means 2 and input to the correction gain calculation means 3, Gmax indicates the maximum gain, that is, the maximum value of the correction gain, and Ymax indicates the maximum luminance output from the filter means 2 (the maximum value in the range of values that the output of the filter means 2 can take).

The maximum luminance Ymax is unambiguously determined by the digital resolution (the number of gradation levels) of the input signal. For an eight-bit gradation scale, the maximum luminance Ymax is 255; for a ten-bit gradation scale, the maximum luminance Ymax is 1023.

The maximum gain Gmax is a correction gain obtained statistically and experimentally in advance such that the dynamic range and contrast of the input image can be improved. Performing a γ correction was an unmodulated, low-contrast type of image processing, but the use of a correction gain produces an image with a strong sense of contrast and improves display quality. The correction gain calculation means 3 may be configured to used a fixed maximum gain value Gmax regardless of the level of the input image, or to switch the maximum gain Gmax in response to the frequency of occurrence of the black level and the white level in the input image, the average image signal level, or other information obtained from the input image, such as the brightness, contrast, luminance distribution, luminance histogram, or color distribution of the subject or of the entire screen. When this type of adjustable maximum gain Gmax is used in a moving picture, the optimum correction gain for the distribution of brightness in the moving picture is obtainable, and the image quality can be optimized.

Figure 3:
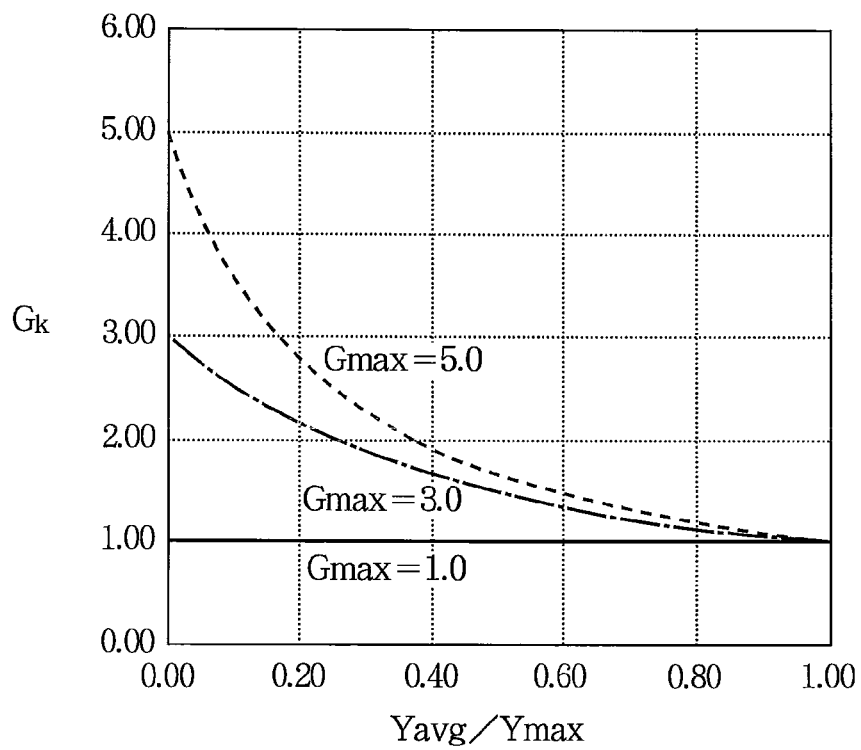
FIG. 3 is a graph showing the correction gain used in the image processing apparatus according to Embodiment A1.
Figures 4, 5:
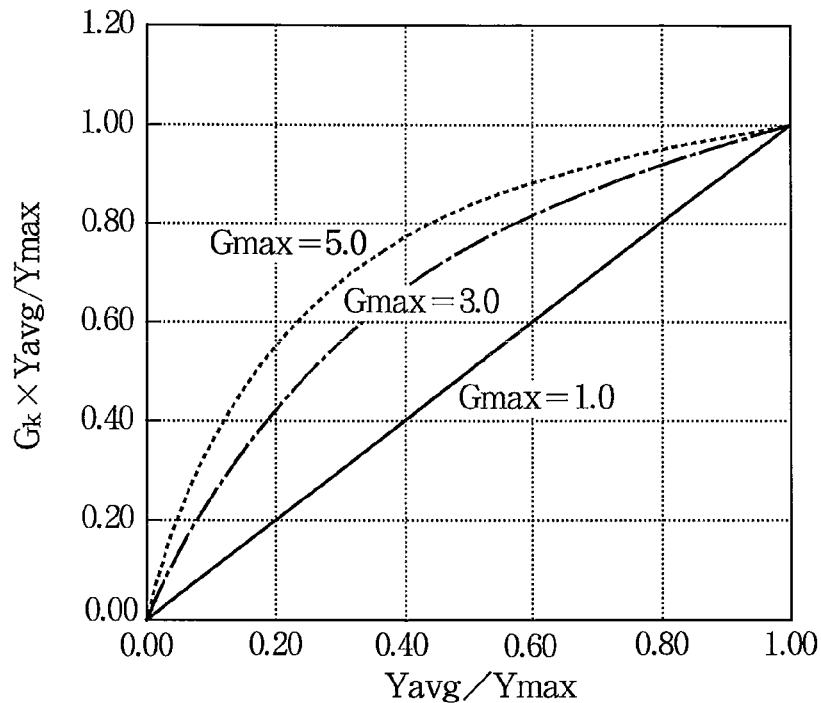
FIG. 4 is a table showing the correction gain used in the image processing apparatus according to Embodiment A1.
FIG. 5 is a graph showing values obtained by multiplying the correction gain used in the image processing apparatus according to Embodiment A1 by a normalized average luminance value.

FIG. 3 is a graph showing the correction gain $G_k$ output from the correction gain calculation means 3; FIG. 4 is a table listing values of the correction gain $G_k$ output from the correction gain calculation means 3. In FIG. 3, the horizontal axis indicates the average luminance Yavg/Ymax, and the vertical axis indicates the correction gain $G_k$.

As shown in FIGS. 3 and 4, when the maximum gain Gmax is greater than one, as the average luminance normalized by the maximum luminance (Yavg/Ymax) increases (accordingly, as the average luminance Yavg increases), the correction gain $G_k$ decreases from the maximum gain Gmax, and when the average gain Yavg becomes equal to the maximum luminance Ymax (when Yavg/Ymax=1), the correction gain $G_k$ becomes equal to unity. Furthermore, if the maximum gain Gmax is one, the correction gain $G_k$ is a unity gain.

Although the correction gain calculation means 3 has been described as being configured to obtain the correction gain $G_k$ by executing the calculation in equation (A3), it may also pre-store the correction gain $G_k$ corresponding to the average luminance Yavg as a lookup table (LUT). If this type of lookup table is used, division processing becomes unnecessary, so the calculation processing in the correction gain calculation means 3 can be simplified. If the correction gain calculation means 3 has a LUT configuration, it may be configured as will be described later with reference to FIG. 24.

FIG. 5 is a graph showing values obtained by multiplying the correction gain used in the image processing apparatus according to Embodiment A1 by the average luminance value normalized by the maximum luminance. In FIG. 5, the horizontal axis indicates the average luminance value normalized by the maximum luminance (Yavg/Ymax), and the vertical axis indicates the value $G_k \times$Yavg/Ymax obtained by multiplying the average luminance value normalized by the maximum luminance (Yavg/Ymax) by the correction gain $G_k$.

The correction gain $G_k$ here is a value determined so that the product $G_k \times$Yavg/Ymax is a monotonically increasing function. FIG. 5 shows this product $G_k \times$Yavg/Ymax of the correction gain when the maximum gain Gmax has values of 1, 3, and 5. A corrected luminance based on a calculation other than $G_k \times Yavg/Ymax$ may be used for the corrected luminance. As can be seen from FIG. 5, when the maximum gain Gmax is unity (1), the input image signal Xin is output without change.

As can be seen from FIG. 5, as the maximum gain Gmax increases, the slope increases on the low-luminance side and decreases on the high-luminance side. By increasing the slope on the low-luminance side, it is possible to improve the contrast of low-luminance parts by amplified output of the low-level part of the signal, which is susceptible to black collapse. By making the slope on the high-luminance side about 1.0 less than the slope on the low-luminance side, it is possible to maintain the luminance and contrast of the signal on the high-luminance side. It is thereby possible to prevent the problem of white collapse on the high-luminance side and obtain a signal with high contrast in the high- and low-luminance parts of the signal, thereby improving visibility.

Figure 6:
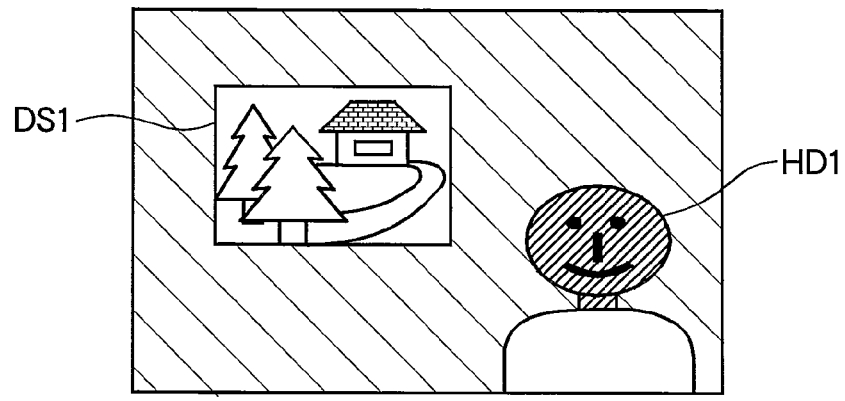
FIG. 6 is a drawing showing an exemplary image before correction by the image processing apparatus according to Embodiment A1.
Figure 7:
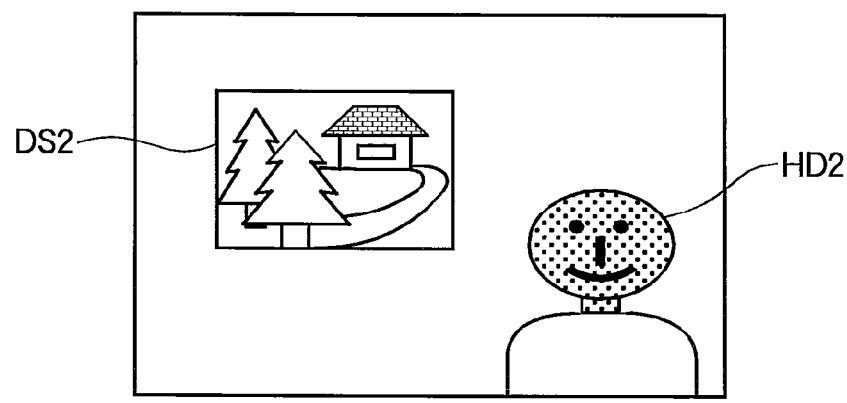
FIG. 7 is a drawing showing the exemplary image after correction by the image processing apparatus according to Embodiment A1.

FIG. 6 is a drawing showing an exemplary image before correction by the image processing apparatus 5 according to Embodiment A1; FIG. 7 is a drawing showing the exemplary image after correction by the image processing apparatus according to Embodiment A1.

FIG. 6 indicates that the bright area, that is, the scenery outside the window (the part designated by the reference characters DS1) is reproduced vividly, but that dark areas, such as the person HD1 inside the room, are in a state close to black collapse.

Figure 8A:
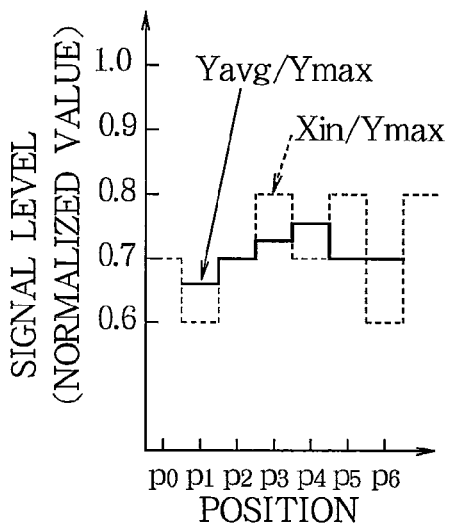
FIG. 8(a) is a graph showing normalized luminance (dotted line) and normalized average luminance (solid line) in the higher luminance areas shown in FIG. 6.

FIGS. 8(*a*) and 8(*b*) relate to the processing of the bright area in the image captured by the image processing apparatus according to Embodiment A1 (that is, to the area DS1 in FIG. 6 in which one can see outside the room through the window), FIG. 8(*a*) being a graph showing the normalized luminance Xin/Ymax from pixel position p0 to pixel position p6 before the gain correction and the normalized average luminance Yavg/Ymax, FIG. 8(*b*) being a graph showing the normalized luminance signal Xin/Ymax and the normalized output signal Xout/Ymax from the same pixel position p0 to pixel position p6 as in FIG. 8(*a*).

As shown by the dotted line in FIG. 8(*a*), the normalized luminance signal Xin/Ymax of the input image signal is 0.6 at pixel position p1, 0.7 at pixel position p2, 0.8 at pixel position p3, 0.7 at pixel position p4, 0.8 at pixel position p5, and 0.6 at pixel position p6.

Accordingly, if the tap count n is three, the normalized average luminance Yavg/Ymax of the input image signal is 0.66 at pixel position p1, 0.70 at pixel position p2, 0.73 at pixel position p3, 0.76 at pixel position p4, 0.70 at pixel position p5, and 0.70 at pixel position p6, as shown by the solid line in FIG. 8(*a*).

If the maximum gain Gmax is 3, from the calculated average luminance Yavg and equation (A3), the correction gain $G_k$ is 1.29 at pixel position p1, 1.25 at pixel position p2, 1.22 at pixel position p3, 1.19 at pixel position p4, 1.25 at pixel position p5, and 1.25 at pixel position p6. Thus the correction gain $G_k$ of each pixel can be calculated by calculating the average luminance Yavg of each pixel.

FIG. 8(*b*) is a graph showing the normalized luminance Xin/Ymax and normalized output luminance Xout/Ymax from the same pixel position p0 to pixel position p6 as in FIG. 8(*a*). As shown by the dotted line in FIG. 8(*b*), the normalized luminance signal Xin/Ymax in the input image signal is 0.6 at pixel position p1, 0.7 at pixel position p2, 0.8 at pixel position p3, 0.7 at pixel position p4, 0.8 at pixel position p5, and 0.6 at pixel position p6.

The gain-corrected output image signal Xout(M, N) at the pixel with coordinates (M, N) can be calculated as in the following equation (A4) from the input image signal Xin(M, N) at the pixel with coordinates (M, N) and the gain $G_k$.

$$Xout(M,N) = G_k \times Xin(M,N) \tag{A4}$$

As shown by the solid line in FIG. 8(*b*), after the gain correction, the normalized output image signal Xout/Ymax is 0.77 at pixel position p1, 0.88 at pixel position p2, 0.98 at pixel position p3, 0.83 at pixel position p4, 1.00 at pixel position p5, and 0.75 at pixel position p6.

When the input image is an RGB signal, the following equations (A5a), (A5b), (A5c) hold in general.

$$Rout(M,N) = G_k \times Rin(M,N) \tag{A5a}$$

$$Gout(M,N) = G_k \times Gin(M,N) \tag{A5b}$$

$$Bout(M,N) = G_k \times Bin(M,N) \tag{A5c}$$

Rout(M, N) is the gain-corrected output R signal at the pixel with coordinates (M, N), Rin(M, N) is the input R signal at the pixel with coordinates (M, N), Gout(M, N) is the gain-corrected output G signal at the pixel with coordinates (M, N), Gin(M, N) is the input G signal at the pixel with coordinates (M, N), Bout(M, N) is the gain-corrected output B signal at the pixel with coordinates (M, N), and Bin(M, N) is the input B signal at the pixel with coordinates (M, N).

When the input image has a YCbCr signal, the following equations (A6a), (A6b), (A6c) hold in general.

$$Yout(M,N) = G_k \times Yin(M,N) \tag{A6a}$$

$$Cbout(M,N) = G_k \times (Cbin(M,N) - Cbof) + Cbof \tag{A6b}$$

$$Crout(M,N) = G_k \times (Crin(M,N) - Crof) + Crof \tag{A6c}$$

Yout(M, N) is the gain-corrected luminance signal at the pixel with coordinates (M, N), Yin(M, N) is the input luminance signal at the pixel with coordinates (M, N), Cbout(M, N) and Crout(M, N) are the gain-corrected color difference signals at the pixel with coordinates (M, N), Cbin(M, N) and Crin(M, N) are the input color difference signals at the pixel with coordinates (M, N), and Cbof and Crof are offsets in the signal processing of the color difference signals.

As shown by equations (A5a), (A5b), and (A5c), the dynamic range can be improved without skewing the white balance in local areas by multiplying the RGB signals uniformly by the same correction gain $G_k$.

FIGS. 9(*a*) and 9(*b*) relate to the processing of the dark area HD1 (an area with low luminance) in the image captured by the image processing apparatus according to Embodiment A1, FIG. 9(*a*) being a graph showing the normalized luminance Xin/Ymax and the normalized average luminance Yavg/Ymax from pixel position q0 to pixel position q6, FIG. 9(*b*) being a graph showing the normalized luminance signal Xin/Ymax and the normalized output signal Xout/Ymax from the same pixel position q0 to pixel position q6 as in FIG. 9(*a*).

As shown by the dotted line in FIG. 9(*a*), the normalized luminance signal Xin/Ymax of the input image signal is 0.1 at pixel position q1, 0.2 at pixel position q2, 0.3 at pixel position q3, 0.2 at pixel position q4, 0.3 at pixel position q5, and 0.1 at pixel position q6. As shown by the solid line in FIG. 9(*a*), the normalized average luminance Yavg/Ymax of the input image signal is 0.16 at pixel position q1, 0.20 at pixel position q2, 0.23 at pixel position q3, 0.26 at pixel position q4, 0.20 at pixel position q5, and 0.20 at pixel position q6. The correction gain $G_k$ is 2.25 at pixel position q1, 2.14 at pixel position q2, 2.05 at pixel position q3, 1.97 at pixel position q4, 2.14 at pixel position q5, and 2.14 at pixel position q6.

Figure 9A:
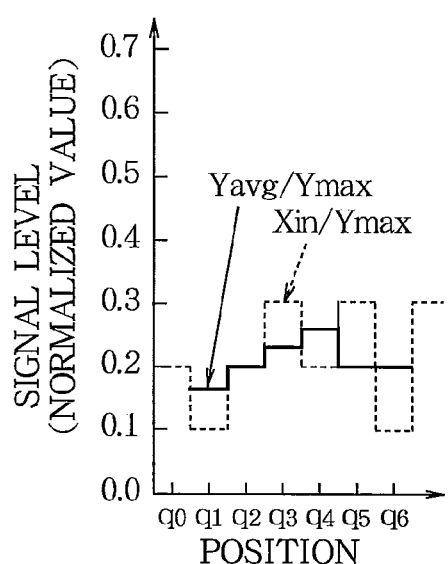
FIG. 9(a) is a graph showing normalized luminance (dotted line) and normalized average luminance (solid line) in the lower luminance areas shown in FIG. 6.
Figure 9B:
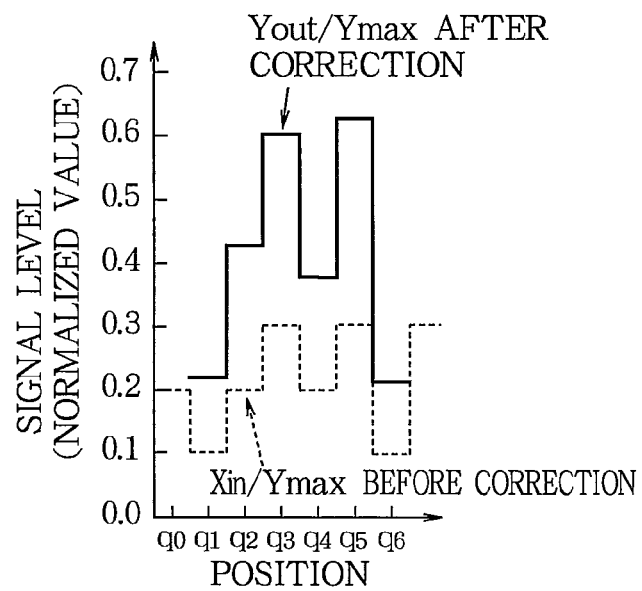
FIG. 9(b) is a graph showing normalized luminance (dotted line) and normalized output luminance (solid line) in the lower luminance areas shown in FIG. 6.

If the input image signal is identical to the luminance signal level, then the gain-corrected output signal at each pixel is 0.23 at pixel position q1, 0.43 at pixel position q2, 0.62 at pixel position q3, 0.39 at pixel position q4, 0.64 at pixel position q5, and 0.21 at pixel position q6, as shown by the solid line in FIG. 9(b).

Figure 8B:
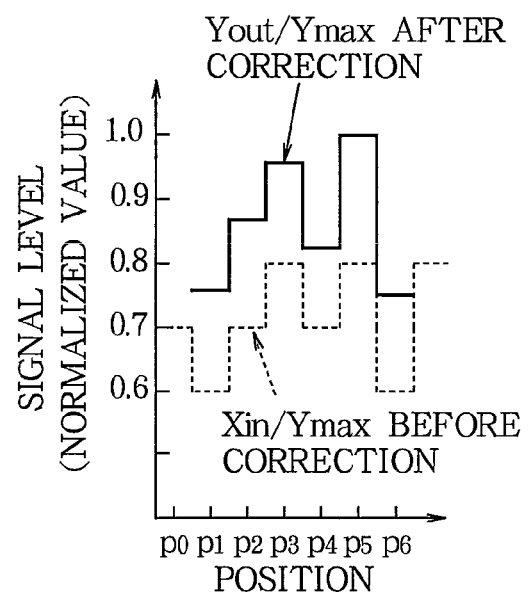
FIG. 8(b) is a graph showing normalized luminance (dotted line) and normalized output luminance (solid line) in the higher luminance areas shown in FIG. 6.

As can be seen from FIG. 8(b), in the bright area DS1, the correction gain is approximately 1.2 and an output image with substantially the same signal level as the input image is output. The contrast at the level of individual pixels is thereby preserved in the bright areas. As can be seen from FIG. 9(b), however, in the dark area HD1 the correction gain is approximately 2. This indicates that the signal level which was compressed at the black level has become brighter and the contrast at the individual pixel level in the dark areas is amplified.

As explained above, the dynamic range can be improved so as to enhance the clarity of the dark area HD1 (HD2 in FIG. 7) while maintaining the existing contrast in the bright area DS1 (DS2 in FIG. 7) by calculating a correction gain $G_k$ for each pixel from the average luminance Yavg and multiplying each pixel in the image signal by the correction gain $G_k$.

Figure 10:
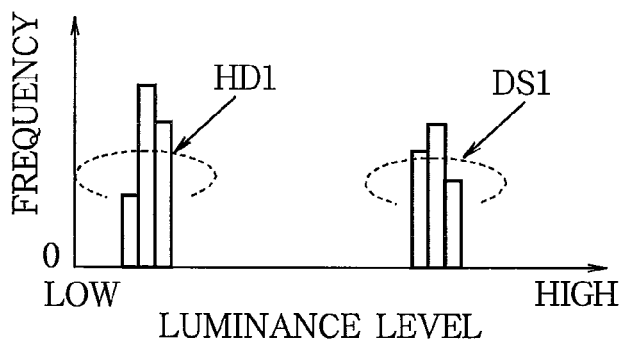
FIG. 10 is a drawing showing the frequency (count) of occurrence of each luminance in the input image (the imaging signal before gain correction) in a histogram.
Figure 11:
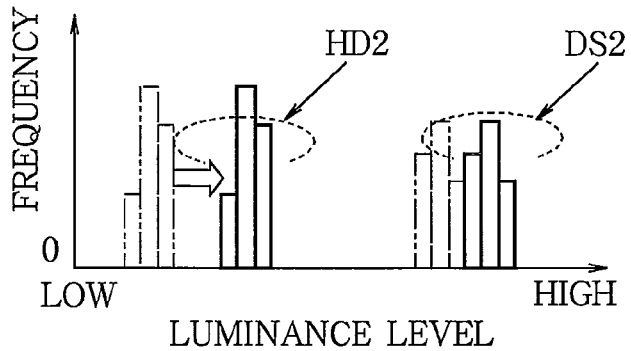
FIG. 11 is a drawing showing the frequency (count) of occurrence of each luminance in an improved image (the imaging signal after gain correction) in a histogram.

FIG. 10 shows the frequency (count) of occurrence of each luminance level in the input image in a histogram; FIG. 11 shows the frequency of occurrence of each luminance level in the improved image (imaging signal after gain correction) in a histogram. FIGS. 10 and 11 show the effect of dynamic range improvement in FIGS. 6, 7, 8(a), 8(b), 9(a), and 9(b) in histograms.

As shown in FIGS. 10 and 11, because the bright area of the input image (DS1 in FIG. 10) is a high-luminance area, the captured image is distributed over high luminance levels. Because the dark area HD1 of the input image is a low-luminance area, the captured image is distributed over low luminance levels.

As shown in FIGS. 10 and 11, when the input image is corrected, in the bright area DS1, because the correction gain is small, the signal indicated by the dash-dot-dot line distributed over the high luminance levels of area DS1 becomes the signal indicated by the solid line in area DS2, with little change. The signal indicated by the dash-dot-dot line distributed over the low luminance levels of area HD1 becomes the signal indicated by the solid line in area HD2, with considerable change.

This indicates that when the correction is carried out by equation (A3), contrast is improved at both low luminance and high luminance, black collapse at low levels is dispelled, and the low-luminance signal is shifted considerably in the high-luminance direction, so an image is obtained with good visibility and clarity, and an improved dynamic range. Furthermore, when the correction is carried out, the average luminance becomes more centrally distributed, so that the image quality can be improved even with a display device (a liquid crystal display, for example) with a narrow dynamic range.

In the image processing apparatus 5 according to Embodiment A1, since the dynamic range of the pixel to be corrected is corrected on the basis of the luminance distribution of the pixel to be corrected and its neighboring pixels, the application timing of the result of the analysis can be greatly shortened, and the dynamic range of the input image can be appropriately improved.

In the image processing apparatus 5 according to Embodiment A1, a pixel by pixel dynamic range expansion can be achieved without the use of an external frame memory, and there is no need for complex calculations, so the calculations and processing can be simplified, the structure can be simplified, and consequently, the cost can be reduced.

Embodiment A2

Figure 12:
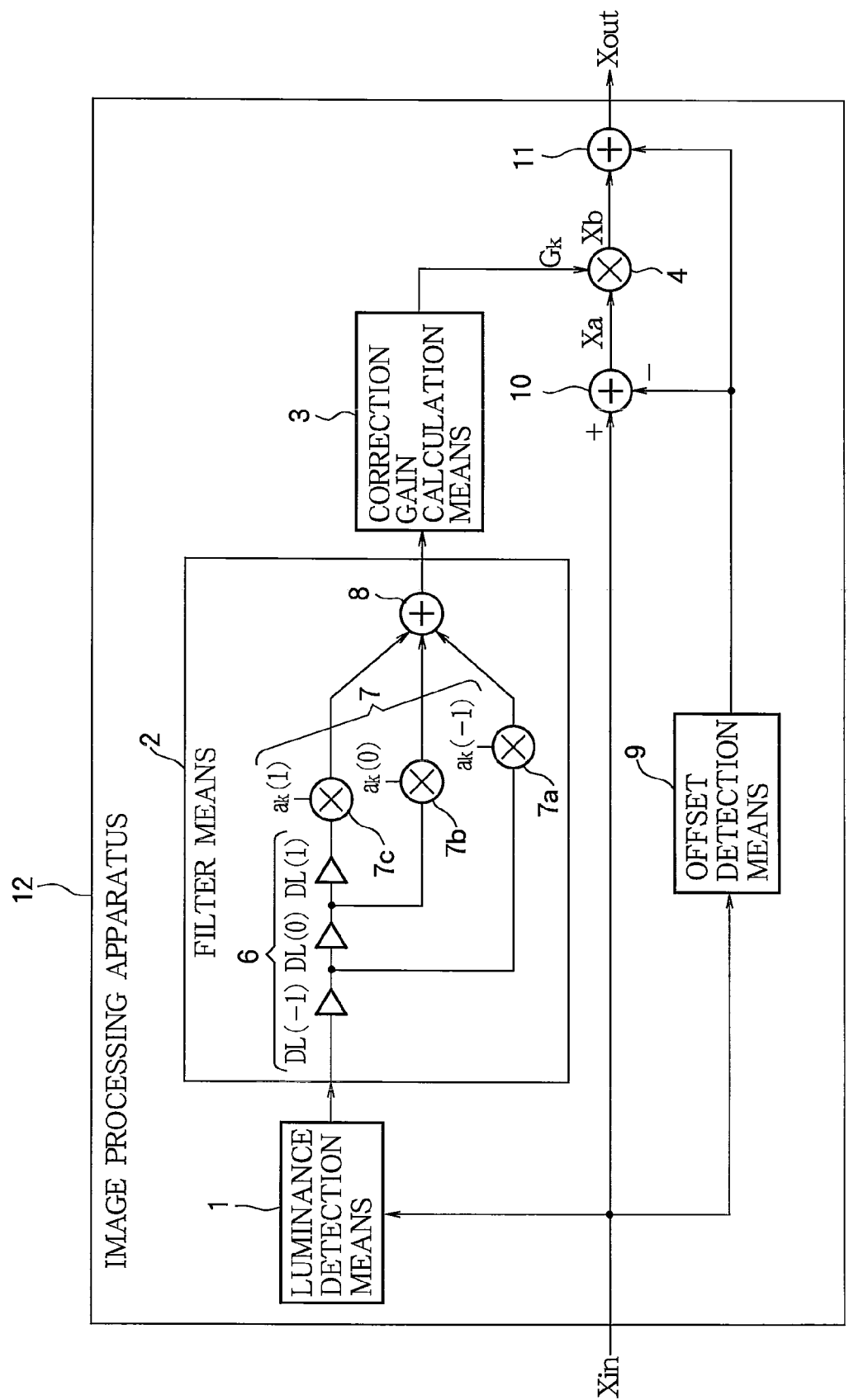
FIG. 12 is a schematic block diagram of an image processing apparatus according to Embodiment A2 of the invention (an apparatus for implementing an image processing method according to Embodiment A2).

FIG. 12 is a schematic block diagram of an image processing apparatus 12 according to Embodiment A2 of the invention (an apparatus for implementing an image processing method according to Embodiment A2). The image processing apparatus 12 according to Embodiment A2 has a luminance detection means 1, a filter means 2, a correction gain calculation means 3, a multiplication means 4, an offset detection means 9, an offset subtraction means 10, and an offset addition means 11. Elements identical to or corresponding to elements in FIG. 1 have the same reference characters.

The image processing apparatus 12 in Embodiment A2 has means for adjusting the offset of the signal level of the input image.

Offset refers to the degree of black offset of the signal level due to the imaging environment and conditions of the subject such as when the imaging element (shown in FIG. 20) is shooting into the light, or when the image is affected by flare of the lens (not shown) of the imaging apparatus.

The correction operation when the offset adjustment is performed will now be described in detail. The offset detection means 9 obtains an offset quantity indicating the degree of black offset of the input image by detecting the minimum signal of the input image Xin. The offset quantity can be obtained from the following equation (A7).

$$\text{Offset} = P \times \text{MIN}(R, G, B) \tag{A7}$$

MIN(R, G, B) indicates the minimum value of the input image RGB signal, and P is a real number satisfying $0 \leq P \leq 1$. The offset quantity can be detected automatically by detecting the minimum value MIN(R, G, B) of the R, G, and B signals of the image on one screen one or more frames before, valid for performing the correction.

FIG. 12 shows a configuration in which the offset quantity is detected automatically from the input image Xin by the offset detection means 9, but a configuration in which the offset quantity is input from an external device may also be used. In an external device, the performance of the external device can be improved by improving the correction gain for the signal of the entity to which the correction is to be applied. More specifically, the external device has functions for carrying out advanced image processing such as biometric authentication of fingerprints, veins, faces, etc. or shape authentication or character recognition, detecting the feature points of the subject (the face, for face authentication), and performing authentication on the basis of the detection result. By determining and setting the offset quantity from the area including the feature points and the signal level detection result in that area, it is possible to emphasize the signal at the feature points. Because the signal level of the feature points is increased, it is also possible to improve the performance of the external device in regard to detection accuracy, authentication rate, etc.

The offset subtraction means 10 subtracts the offset quantity determined by the offset detection means 9 from the input R signal Rin(M, N) at coordinates (M, N), the input G signal Gin(M, N) at coordinates (M, N), and the input B signal Bin(M, N) at coordinates (M, N), and outputs Rin(M,N)−Offset, Gin(M,N)−Offset, and Bin(M,N)−Offset.

The operation means 4 multiplies the signals from which the offset quantity has been subtracted, as output from the offset subtraction means 10, by the correction gain $G_k$ obtained from the correction gain calculation means 3, and outputs $G_k \times (Rin(M,N) - Offset)$, $G_k \times (Gin(M,N) - Offset)$, and $G_k \times (Bin(M,N) - Offset)$.

The offset addition means 11 receives the product signal from the addition means 8, adds the same offset quantity as used in the offset subtraction means 10, and outputs $G_k \times (Rin(M,N) - Offset) + Offset$, $G_k \times (Gin(M,N) - Offset) + Offset$, and $G_k \times (Bin(M,N) - Offset) + Offset$.

The operation of the offset subtraction means 10, operation means 4, and offset addition means 11 is expressed by the following equations (A8a), (A8b), and (A8c).

$Rout(M,N) = G_k \times (Rin(M,N) - Offset) + Offset$ (A8a)

$Gout(M,N) = G_k \times (Gin(M,N) - Offset) + Offset$ (A8b)

$Bout(M,N) = G_k \times (Bin(M,N) - Offset) + Offset$ (A8c)

When offset correction is not carried out, the correction gain $G_k$ amplifies the offset quantity Offset, decreasing the correction gain applied to the signal the contrast of which is to be improved, converting it to a signal lacking in allover contrast. If an offset correction is carried out, the correction gain applied to the signal the contrast of which is to be improved can be increased, so the operation can be carried out with higher contrast.

The offset quantities used by the offset subtraction means 10 and offset addition means 11 may have different values within the range $0 \leq P \leq 1$. In particular, making the offset quantity (Offset1) used by the offset addition means 11 less than the offset quantity (Offset) used by the offset subtraction means 10 has the effect of reducing the black offset. In the offset corrected signal, that is, in addition to the prevention of black collapse, the offset quantity Offset1 corrects the black offset before the offset correction, thereby enabling improvement of the quality of an unclear image with an uncrisp black signal. That is, an image having crisp black levels is obtained. The operation when the offset quantity (Offset1) used by the offset addition means 11 is less than the offset quantity (Offset) used by the offset subtraction means 10 is expressed by the following equations (A9a), (A9b), (A9c), and (A9d).

$Rout(M,N) = G_k \times (Rin(M,N) - Offset) + Offset1$ (A9a)

$Gout(M,N) = G_k \times (Gin(M,N) - Offset) + Offset1$ (A9b)

$Bout(M,N) = G_k \times (Bin(M,N) - Offset) + Offset1$ (A9c)

Offset > Offset1 (A9d)

In regard to points other than the above, Embodiment A2 is identical to Embodiment A1.

The image processing apparatus 12 according to Embodiment A2 enables the detection of the amount of offset of an image, and accordingly the improvement of the image quality by an offset correction based on the detected offset quantity Offset to improve the contrast among signals distributed in lower luminance areas.

In the image processing apparatus according to Embodiment A2, the amount of offset subtracted before the correction gain process and the amount of offset added after the correction gain process can be switched and the crispness of the black signal after the offset correction can be increased, improving the image quality.

Embodiment A3

In the image processing apparatus according to Embodiment A3, the equation by which the correction gain calculation means 3 calculates the correction gain differs from the equation (A3) shown in Embodiment A1. Specifically, the correction gain $G_k$ is obtained from the following equation (A10), using the maximum gain Gmax, the minimum gain Gmin, the average luminance Yavg, and the maximum luminance Ymax.

$$G_k = \frac{Gmax}{1 + \left(\frac{Gmax}{Gmin} - 1\right) \times \frac{Yavg}{Ymax}}$$ (A10)

Gmin indicates the minimum gain by which the high-luminance signal of the input image is multiplied (the gain by which the luminance signal of the input image signal Xin is multiplied when it attains its maximum value).

Figure 13:
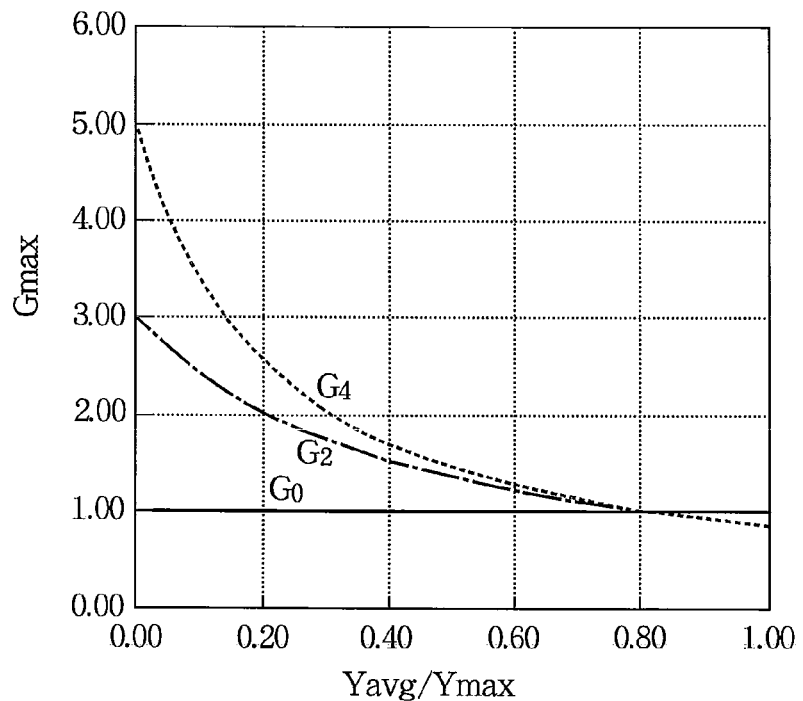
FIG. 13 is a graph showing the correction gain used in the image processing apparatus according to Embodiment A3.
Figure 14:
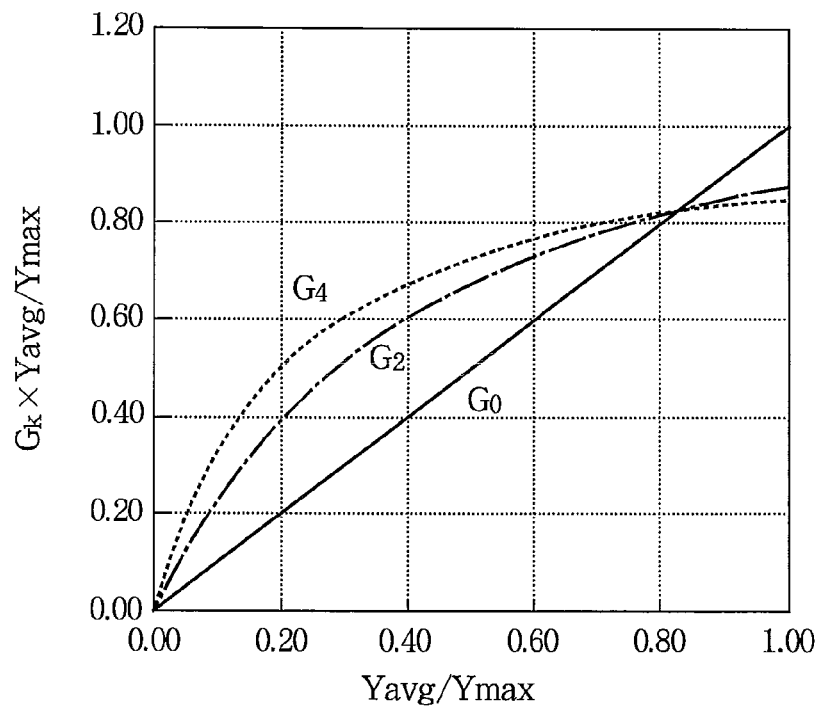
FIG. 14 is a graph showing values obtained by multiplying the correction gain used in the image processing apparatus according to Embodiment A3 by a normalized average luminance value.

FIG. 13 is a graph showing the correction gain $G_k$ output from the correction gain calculation means 3 that performs the calculation in equation (A10); FIG. 14 is a graph showing values obtained by multiplying the correction gain used in the image processing apparatus according to Embodiment A3 by an average luminance normalized by the maximum luminance. In FIG. 14, the horizontal axis indicates the average luminance normalized by the maximum luminance (Yavg/Ymax), and the vertical axis indicates the value ($G_k \times$Yavg/Ymax) of the average luminance normalized by the maximum luminance (Yavg/Ymax) multiplied by the correction gain $G_k$.

Gmin is an experimentally or statistically obtained minimum value of the correction gain $G_k$; the correction gain $G_k$ obtained by equation (A10) differs from the correction gain $G_k$ obtained by equation (A3) by having a value less than unity in the range in which Yavg/Ymax is large (near unity). In an area in which the average luminance is high, the signal levels of the pixels are scattered around the average luminance. Given this scatter of the pixel signals, a smaller correction gain is obtained than from equation (A3), so white collapse in high-luminance areas can be prevented. The loss of the contrast signal by white collapse in high-luminance areas can be prevented; the contrast signal can be preserved, compressed by the correction gain Gmin.

Figure 15:
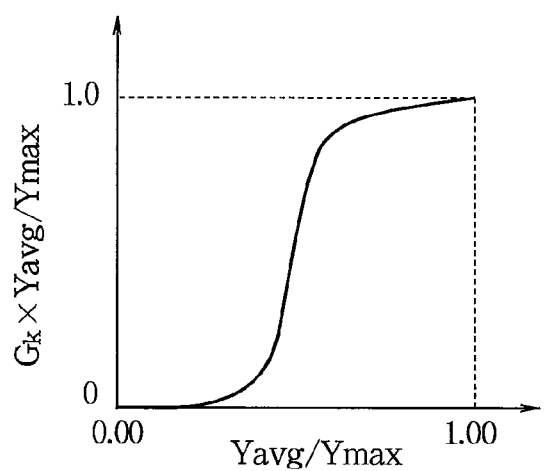
FIG. 15 is a graph showing values obtained by multiplying the correction gain used in another image processing apparatus according to Embodiment A3 by a normalized average luminance value.
Figure 16:
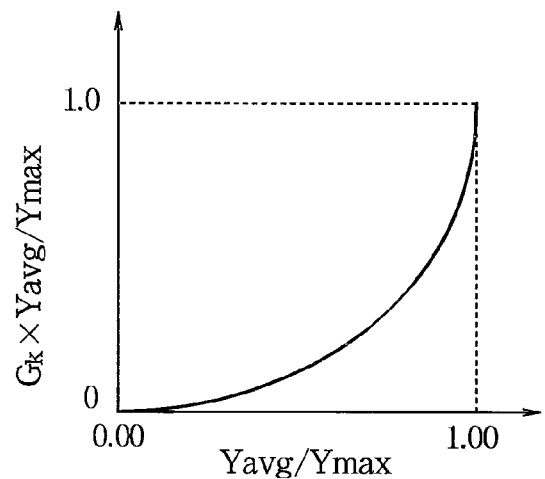
FIG. 16 is a graph showing values obtained by multiplying the correction gain used in another image processing apparatus according to Embodiment A3 by a normalized average luminance value.

The correction gain curve (the plot of values obtained by multiplying the correction gain by the average luminance normalized by the maximum luminance) is not limited to the curves shown in FIG. 14; correction gains having curves like the ones shown in FIGS. 15 and 16 can also be implemented. The optimal dynamic range improvement for the display device (not shown) or imaging apparatus can be performed by using correction gains like these, in consideration of the gradation characteristics of the display device or imaging apparatus.

In regard to points other than the above, Embodiment A3 is identical to Embodiment A1 or A2.

According to the image processing apparatus 5 or image processing apparatus 12 in Embodiment A3, the contrast information of a high-luminance signal with a bright luminance distribution can be preserved and white collapse can be prevented.

Embodiment A4

In the image processing apparatus according to Embodiment A4 of the present invention, the content of the filtering process carried out by the filter means 2 differs from the above Embodiments A1 to A3. The filter means in Embodiment A4 comprises, for example, an epsilon filter (ε-filter), which is a nonlinear filter.

Figure 17:
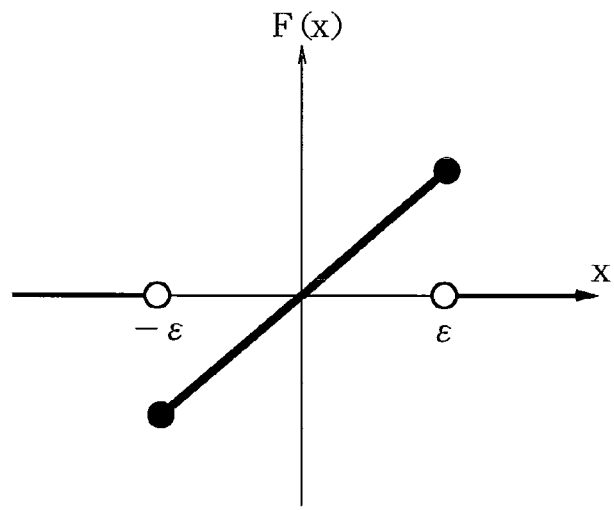
FIG. 17 is a graph showing a piecewise linear function when the filter means in the image processing apparatus according to Embodiment A4 of the invention is an ε-filter.
Figure 18:
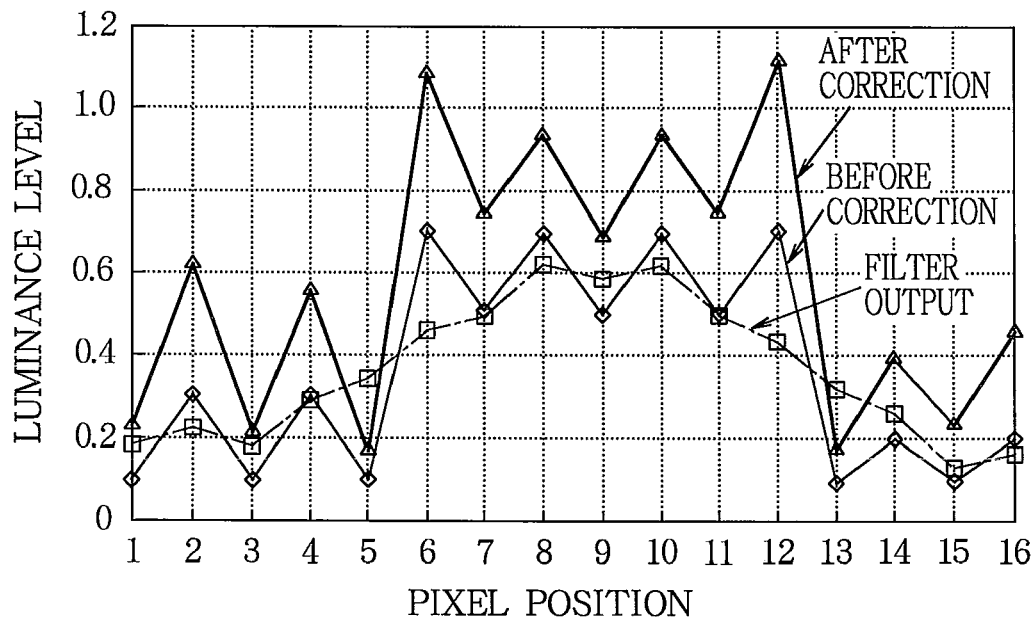
FIG. 18 is a graph showing, as a comparative example, luminance signal levels after correction by an image processing apparatus using a linear filter as the filter means.
Figure 19:
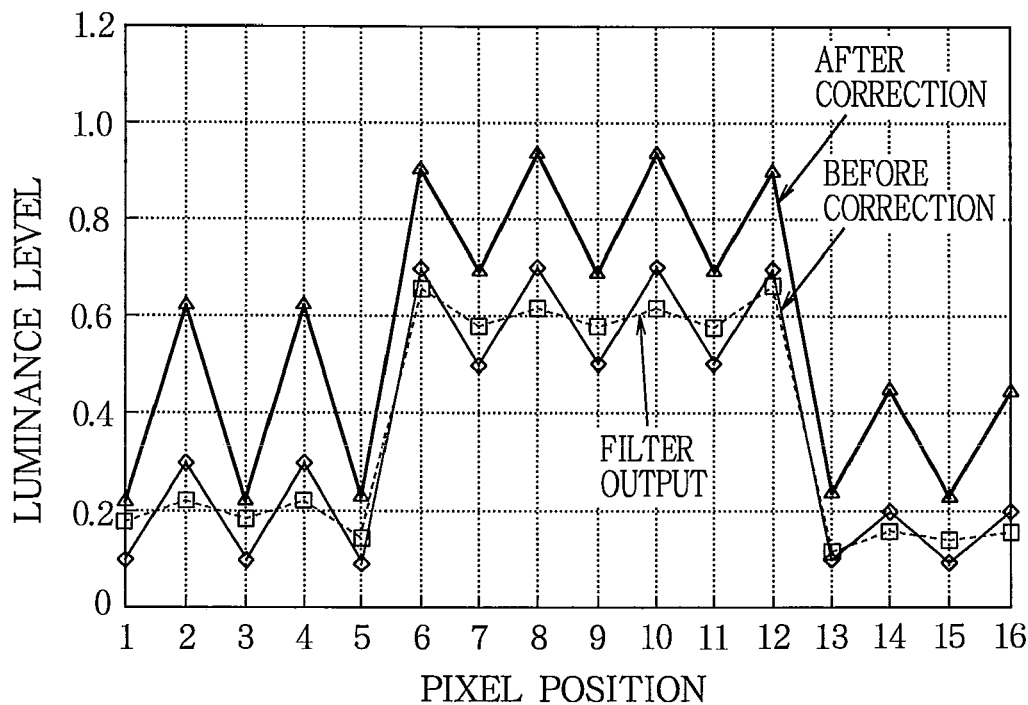
FIG. 19 is a graph showing luminance signal levels after correction when a non-linear filter is used as the filter means of the image processing apparatus according to Embodiment A4.

FIG. 17 is a graph showing a piecewise linear function when the nonlinear filter of the filter means in the image processing apparatus according to Embodiment A4 comprises an ε-filter. FIG. 18 is a graph showing, as a comparative example, luminance signal levels after correction by an image processing apparatus using a linear filter as the filter means. FIG. 19 is a graph showing luminance signal levels after correction when the non-linear filter of Embodiment A4 is used.

In the comparative example in which a linear filter is used as the filter means, because the input image is smoothed as shown in FIG. 18, when there is an area with an abrupt change in areal luminance in the input image (for example, the abrupt change in luminance level between pixel positions 5 and 6 in FIG. 18 before the correction), the average luminance Yavg is affected by the abrupt luminance change. The average luminance (filter output) shown in FIG. 18 is the value obtained with a tap count of n=5.

The average luminance (filter output) output for pixel position 5, which is affected by the high luminance signal at pixel positions 6 and thereafter, has a higher level than the average luminance output from pixel position 1 to pixel position 4. As the average luminance is raised, the correction gain is reduced, and it can be seen that the signal level of the output image after the correction (the thick line in FIG. 18) is lowered at pixel position 5.

The average luminance at pixel position 6, being affected by the luminance signal at pixel positions up to 5, has a small value. The correction gain is consequently increased, and the output level after the correction (the thick line in FIG. 18) has a high value. In an area (an edge area) with strong luminance variations between pixels, increasing the correction gain enhances the signal in the edge area, and enhances the sense of contrast due to the aperture effect. By providing an aperture effect, it is possible to enhance edges and generate a modulated image with high visibility and high display quality in image processing for the purpose of viewing in photograph or display form, or in a recognition apparatus that uses an edge-enhanced image for recognition processing.

In an authentication apparatus that detects feature points from slight contrast differences, however, it is necessary to output a faithful signal without edge enhancement in preprocessing. When there are areas with abrupt luminance variations, accordingly, it is necessary to take cognizance of the luminance variations in the average luminance.

In Embodiment A4, accordingly, by giving the filter means 2 a nonlinear filter characteristic, it becomes possible to eliminate the above problem, even when there are abrupt luminance changes. A nonlinear ε-filter, for example, is used in the filter means 2. A one-dimensional ε-filter is generally defined by the following equations (A11) and (A12).

$$y(n) = x(n) - \sum_{k=-N}^{N} \{a_k \times f(x(n) - x(n-k))\} \quad (A11)$$

$$\sum_{k=-N}^{N} a_k = 1 \quad (A12)$$

The function f(x) is a piecewise linear function of the variable x, given by the following equation (A13). y(n) is the average luminance of the ε-filter output of the Y signal, and x(n) indicates the luminance of pixel n. Equation (A13) takes the difference in value between a pixel (n) and the pixels to be averaged (±k pixels). If the difference value is ε or less, then the difference value is used to obtain the average value; if the difference value exceeds ε, then α (here, 0) is used. By this type of processing, it is possible to obtain a correction gain that is not skewed by abrupt changes in luminance when the luminance varies in particular ways due to edges accompanied by abrupt luminance changes or noise.

$$f(x) = \begin{cases} x(n) - x(n-k) & |x(n) - x(n-k)| \le \varepsilon \\ \alpha & \text{otherwise} \end{cases} \quad (A13)$$

The function when α=0 is the piecewise linear function shown in FIG. 17.

FIG. 19 indicates the average luminance when a nonlinear ε-filter is used as the filter means 2. The luminance change (trend) of the input image (the signal before the correction) is reproduced at pixel positions 5 and 6. The luminance change (trend) of the input image is also reproduced in the signal level of the output image calculated by the gain correction (the signal level after the correction), differing from the plots in FIG. 18.

Thus by use of an ε-filter, an optimal dynamic range conversion process can be implemented that preserves edge information when there is an abrupt luminance change in the input image (the signal before the correction).

An ε-filter can be configured from a comparator and a line memory, with such effects as a reduced hardware footprint and reduced software processing time.

The configuration is not limited to an ε-filter; other nonlinear filters, such as a median filter or a stack filter, may be used provided they furnish means of detecting the luminance level of an area.

In regard to points other than the above, Embodiment A4 is identical to Embodiment A1, A2, or A3.

According to the signal processing apparatus 5 or signal processing apparatus 12 in Embodiment A4, the output of the filter means can preserve edge information and suppress the Mach effect when there are abrupt luminance changes.

Embodiment B1

Figure 20:
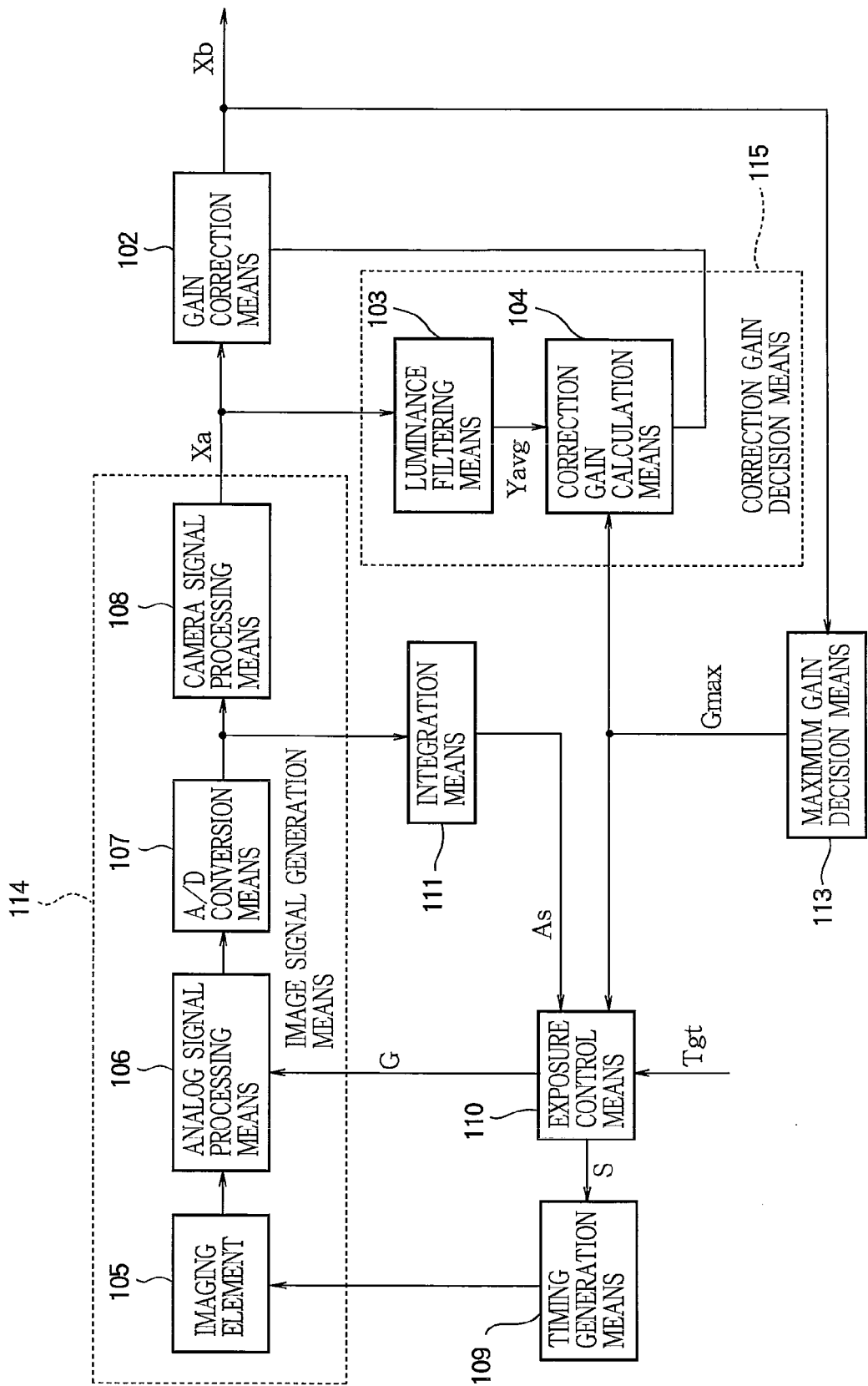
FIG. 20 is a schematic block diagram of an imaging apparatus according to Embodiment B1 of the invention (an apparatus for implementing an image processing method according to Embodiment B1).

FIG. 20 is a block diagram showing the structure of an imaging apparatus according to Embodiment B1 of the invention (an apparatus implementing the imaging method according to Embodiment B1).

As shown in FIG. 20, the imaging apparatus according to Embodiment B1 comprises an imaging element 105, an analog signal processing means 106, an A/D conversion means 107, a camera signal processing means 108, a timing generation means 109, an integration means 111, an exposure control means 110, a gain correction means 102, a luminance filtering means 103, a correction gain calculation means 104 and a maximum gain decision means 113. The camera signal processing means 108, the integration means 111, the exposure control means 110, the gain correction means 102, the luminance filtering means 103, the correction gain calculation means 104 and the maximum gain decision means 113 may comprise hardware such as electrical circuits, software operating according to a program, or a combination of hardware and software.

The imaging element 105 is, for example, a CCD (Charge Coupled Device) sensor having a photodiode array that optically receives and photoelectrically converts a light signal from a subject, and means including a vertical transfer CCD and horizontal transfer CCD for external output of the signals from the photodiode array.

The imaging element 105 can read out the charges accumulated in the photodiode array once per frame interval through the vertical transfer CCD and horizontal transfer CCD by applying charge readout pulses from the timing generation means 109.

The charges accumulated in the photodiode array can also be flushed to the substrate level of the imaging element 105 by charge flushing pulses from the timing generation means 109. The interval from the cessation of the application of charge flushing pulses to the reading out of the accumulated charge through vertical transfer CCD by application of charge readout pulses is the charge accumulation time S. The reciprocal of the charge accumulation time S corresponds to the shutter speed. The charge accumulation time S is controlled by a control signal from the exposure control means 110.

The analog signal processing means 106 receives the imaging signal from the imaging element 105, carries out CDS (correlated double sampling) processing and amplification with gain G, and outputs an analog signal. The amplification gain G is controlled by a control signal from the exposure control means 110.

The A/D conversion means 107 receives the analog signal from the analog signal processing means 106, converts it to a digital signal, and outputs the digital signal.

The timing generation means 109 generates drive timing pulses for the imaging element 105. When the imaging element 105 is a CCD sensor, for example, the drive timing pulses include horizontal transfer-pulses that transfer charges in the horizontal CCD, vertical transfer pulses that transfers charges in the vertical CCD, charge flushing pulses that flush the accumulated charge to the CCD substrate level for electronic shutter operation, and reset pulses that reset the charges transferred horizontally in the horizontal CCD on a pixel by pixel basis.

The timing generation means 109 also generates sampling pulses for the analog signal processing means 106 and an A/D conversion clock signal for the A/D conversion means 107.

The imaging element 105 is not limited to a CCD sensor; it may be, for example, a CMOS sensor. CMOS and other sensors that employ different methods of resetting pixel charges or different drive methods for reading out the charges may also be used, provided that exposure can be controlled.

The sensor in the example above has an electronic shutter function, but the present invention is also applicable to imaging apparatus capable of light adjustment by a diaphragm or exposure time adjustment by a mechanical shutter.

The camera signal processing means 108 receives the digital signal output from the A/D conversion means 107, generates an RGB signal by white balance processing and interpolation processing, carries out further processing such as YCbCr conversion, color matrix conversion, and gradation scale conversion, and outputs an imaging signal Xa.

The imaging element 105, analog signal processing means 106, A/D conversion means 107, and camera signal processing means 108 constitute an imaging signal generation means 114 that receives light from a subject and outputs an imaging signal (the first imaging signal) Xa responsive to the light.

Imaging signal Xa is, for example, a three-color imaging signal (referred to below as an RGB signal) having red (R), green (G), and blue (B) components arranged in a two-dimensional 640 (horizontal)×480 (vertical) pixel matrix with an eight-bit gradation scale. The R signal level of the imaging signal Xa is expressed by R(M, N); similarly, the G signal level is expressed by G(M, N), and the B signal level is expressed by B(M, N), where M indicates horizontal pixel position and N indicates vertical pixel position.

The imaging signal Xa is not limited to an RGB signal; it may be a YCbCr signal, an L*a*b* signal, or an HSV (hue, saturation, value) signal. When a YCbCr signal or an HSV signal is used as the imaging signal Xa, the luminance filtering means 103 (input stage) includes a color conversion means (not shown) for color conversion of signals in these color spaces to RGB signals.

The gradation scale of the imaging signal Xa is not limited to the above eight-bit scale; other scales may be used, such as the ten-bit or twelve-bit scale employed for still image files. The number of pixels is not limited to the values given; other values, such as 1024 (horizontal)×960 (vertical) pixels, may be used.

The integration means 111 obtains an integrated value As of the digital signal output from the A/D conversion means 107 on each of a plurality of metering windows that constitute parts of the screen. The metering windows divide the effective pixel area of the screen into areas with a size of 10 pixels×10 pixels, for example. When metering windows sized at 10 pixels×10 pixels are used on a screen with 640×480 effective pixels, 64×48 metering windows can be obtained. The number of metering windows, their size, and their positions may be determined arbitrarily.

The exposure control means 110 uses the integrated values As of the metering windows in the integration means 111 to determine the exposure conditions of the imaging apparatus and controls the exposure.

In the configuration in FIG. 20, exposure is controlled by control of the charge accumulation time (exposure time) S by the timing generation means 109, and by control of the amplification gain G in the analog signal processing means 106. Specifically, the 'exposure value' is controlled to be proportional to the product of the charge accumulation time S and the amplification gain G.

Figure 21:
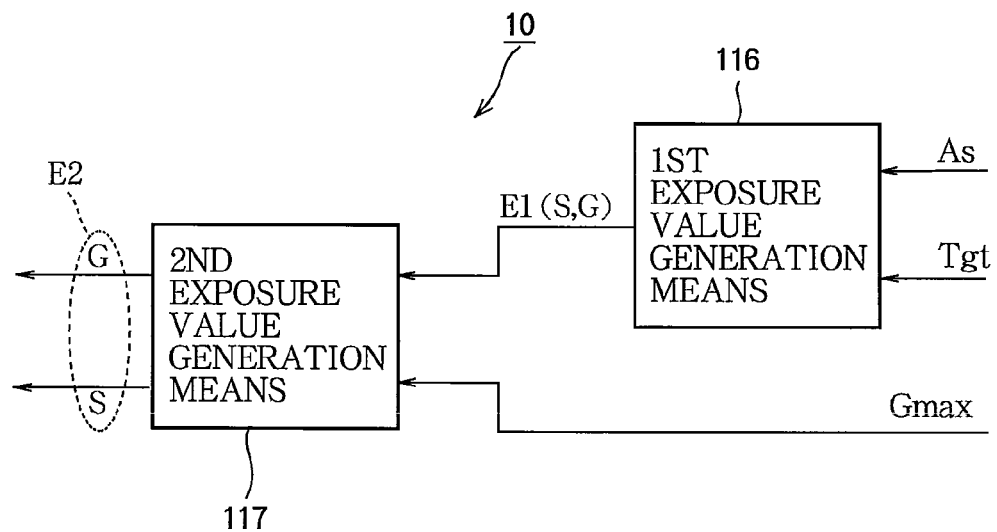
FIG. 21 is a block diagram showing an example of an exposure control means used in Embodiment B1.

FIG. 21 shows an example of the exposure control means 110. The exposure control means 110 comprises a first exposure value generation means 116 and a second exposure value generation means 117.

The first exposure value generation means 116 selects one or more effective metering windows from the integrated values As of the metering windows by following an empirically or statistically derived algorithm and generates an exposure value (first exposure value) E1 for bringing the APL (Average Picture Level) obtained from the integrated value As of the selected metering windows to a target value (for example, 50% of the maximum value) Tgt. The target value Tgt is supplied from, for example, a control means not shown in the drawing.

The second exposure value generation means 117 receives the maximum value Gmax of the correction gain and modifies the first exposure value E1 by using an exposure correction value Kd obtained from the maximum value Gmax of the correction gain as will be explained later with reference to FIGS. 28, 29, 30, 34, and 35 to generate a corrected exposure value ('second exposure value' below) E2.

The first exposure value E1 controls the charge accumulation time S and gain G, to which it is related by $$E1 = Kf \times S \times G$$

(where Kf is a constant), while the second exposure value E2 also controls the charge accumulation time S and gain G, to which it is related by $$E2 = Kf \times S \times G$$

(where S and G have different values than for E1).

Figure 22:
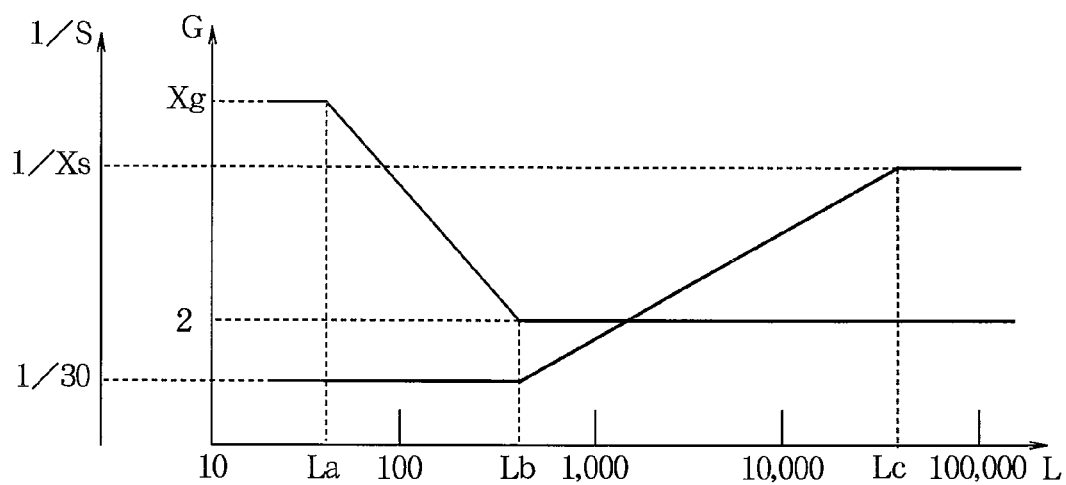
FIG. 22 is a graph showing relations between subject brightness, charge accumulation time, and gain in the signal processing means in Embodiment B1.

FIG. 22 is a log-log graph showing exemplary control curves for exposure control. The horizontal axis represents the illuminance L of the subject while the vertical axis represents the gain G and the reciprocal 1/S of the charge accumulation time S. Under bright conditions with an illuminance higher than a certain first illuminance Lb, the gain G has a fixed value (G=2) and the charge accumulation time S is shortened (to a higher shutter speed S) as the illuminance increases. Under dark conditions with an illuminance lower than the first illuminance Lb, the charge accumulation time S has a fixed value and the gain G increases as the illuminance decreases. Below a certain second illuminance La (La<Lb), the gain G is fixed at a maximum value Xg. Above a certain third illuminance Lc, the gain G and the charge accumulation time S are held fixed. The purpose of the curves in FIG. 22 is to bring the APL to a predetermined value such as 50% of the maximum value, for example, in the range in which the illuminance L is higher than the second illuminance La and lower than the third illuminance Lc.

When the charge accumulation time S and gain G are determined using the control curve in FIG. 22, the charge accumulation time S and gain G are set to certain initial values S0 and G0, and the illuminance L of the subject is calculated from the integrated value As at the time by $$L = Ka \times As / (S0 \times G0)$$

(where Ka is a prescribed constant), and the charge accumulation time S and gain G are determined from the illuminance L of the subject by using the curves in FIG. 22. The product of the charge accumulation time S and gain G obtained in this way and the predetermined constant Kf matches the first exposure time E1. After determination of the first exposure time E1, when a correction coefficient Kd is given and a second exposure value E2 is calculated by use of the correction coefficient Kd, one or both of the charge accumulation time S and gain G is modified so as to make the product of the charge accumulation time S, the gain G, and the constant Kf match the second exposure value E2. For example, in FIG. 22, the gain G is varied in the range (below the first illuminance Lb) in which the charge accumulation time S has a fixed value, and the charge accumulation time S is varied in the range (equal to and above the first illuminance Lb) in which the gain G has a fixed value. Neither the charge accumulation time S nor the gain G is altered in the range (equal to and above the third illuminance Lc) in which both the charge accumulation time S and the gain G have fixed values.

The foregoing shows only one exemplary form of exposure control; other forms of exposure control may also be used. For example, in the description above the first exposure value E1 is determined from an integrated value As obtained from one frame, but the first exposure value E1 can be made to converge to a more appropriate value by an iterated process in which a subsequent frame (second frame) is imaged using a charge accumulation time S and gain G corresponding to the first exposure value E1 obtained from the one frame (first frame) and the first exposure value E1 is recalculated based on the integrated value obtained from the second frame; then the second exposure value E2 can be generated after the first exposure value E1 has converged.

In this case, the exposure control means 110 can include a switching means that supplies (control signals indicating) the charge accumulation time S and gain G corresponding to the first exposure value E1 to the imaging element 105 and analog signal processing means 106 instead of (control signals indicating) the charge accumulation time S and gain G corresponding to the second exposure value E2.

The luminance filtering means 103 performs a filtering process on the values of each pixel and its neighboring pixels in the luminance component of the imaging signal Xa output from the camera signal processing means 108 (a luminance signal included in the imaging signal Xa or a luminance signal generated from the imaging signal Xa).

The correction gain calculation means 104 calculates the correction gain $G_k$ for each pixel based on the filtering output from the luminance filtering means 103 and maximum value Gmax of the correction gain.

The luminance filtering means 103 and correction gain calculation means 104 comprise a correction gain decision means 115 which performs a filtering process on the values of each pixel and its neighboring pixels in the luminance component of the imaging signal Xa, and determines the correction gain $G_k$ based on the filtering output and maximum value Gmax of the correction gain.

Figure 23:
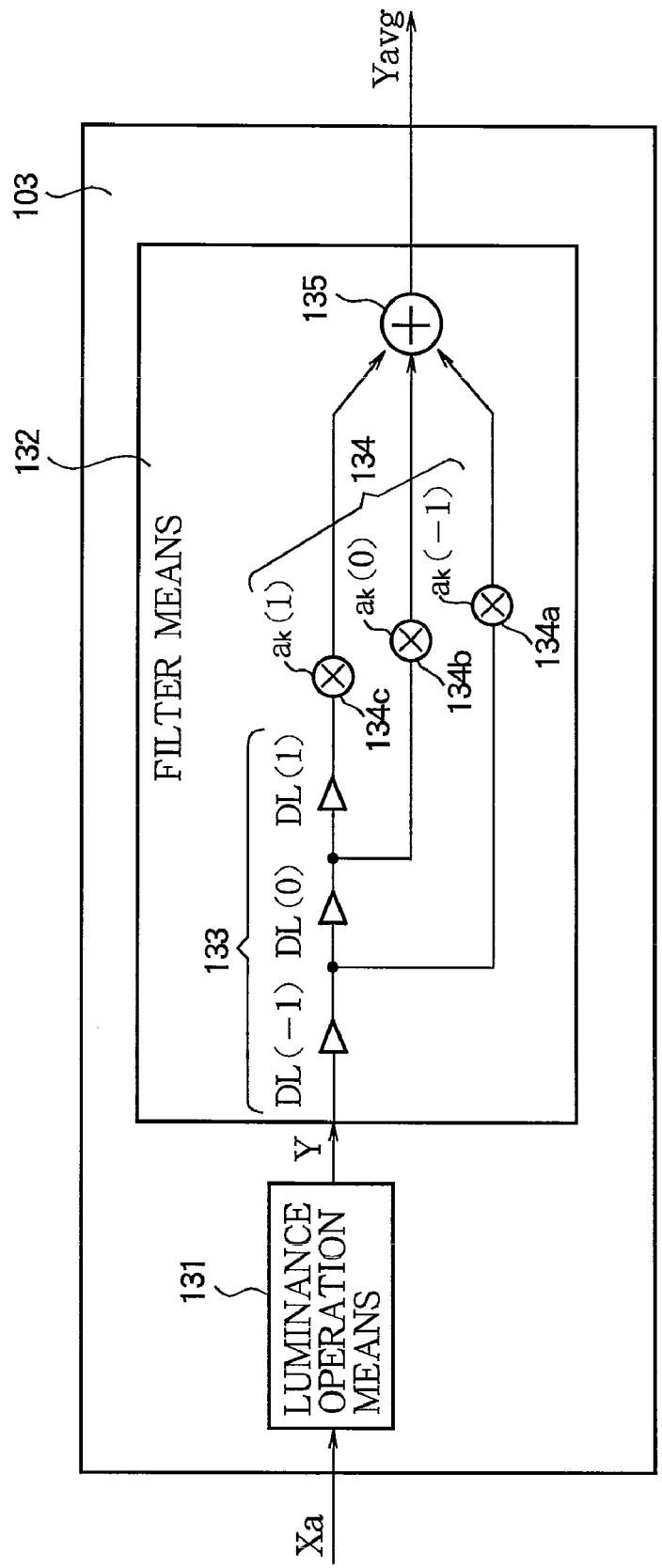
FIG. 23 is a block diagram showing an example of a luminance filter means used in Embodiment B1.

FIG. 23 is a block diagram showing an example of the luminance filtering means 103. The luminance filtering means 103 comprises a luminance operation means 131 and a filter means 132, generates a luminance signal Y from the imaging signal Xa output from the camera signal processing means 108, and calculates and outputs a filtering output, average luminance signal Yavg for example, over a plurality of pixels having consecutive luminance signal.

The luminance operation means 131 and the luminance operation means 131 in FIG. 23 correspond respectively to the luminance detection means 1 and the filter means 2 in FIG. 1, and have the same functions. The correction gain calculation means 104 and the gain correction means 102 in FIG. 20 correspond respectively to the correction gain calculation means 3 and the operation means 4 in FIG. 1.

The luminance operation means 131 determines and outputs the luminance signal component from the imaging signal Xa. In the ITU-R BT.709 standard, the luminance signal Y can be obtained from the RGB signal by the following equation (B1).

$$Y = 0.299 \times R(M,N) + 0.587 \times G(M,N) + 0.114 \times B(M,N) \qquad (B1)$$

The conversion formula for obtaining the luminance signal Y from the RGB signal is determined by the standard of the color space used by the system in which the image processing is performed, and is not limited to the above equation (B1). If the imaging signal Xa includes a luminance signal Y, the luminance operation means 131 does not carry out a calculation to obtain the luminance signal Y but simply extracts the luminance signal Y from the imaging signal Xa and outputs it to the filter means 132.

The filter means 132 is a one-dimensional n-tap finite impulse response digital filter having a delay means 133, a coefficient means 134, and an addition means 135. The delay means 133 has a delay element DL(−1) that delays the luminance signal of the imaging signal Xa, a delay element DL(0) that delays the output of delay element DL(−1), and a delay element DL(1) that delays the output of delay element DL(0). The coefficient means 134 has a multiplier 134a that multiplies the output of delay element DL(−1) by a coefficient $a_k(-1)$, a multiplier 134b that multiplies the output of delay element DL(0) by a coefficient $a_k(0)$, and a multiplier 134c that multiplies the output of delay element DL(1) by a coefficient $a_k(1)$. The tap count n satisfies the condition n=2×k+1 (where k is a positive integer).

Alternatively, the output of the luminance operation means 131 can be input directly to the delay element DL(0) and the multiplier 134a, without providing delay element DL(−1).

The filter means 132 carries out a filtering process on the luminance signal Y output from the luminance operation means 131 and, after the filtering process, outputs a filtered signal. FIG. 23 shows a case in which the tap count n is three. The filtered signal output from the filter means 132 is, for example, an average luminance Yavg which may be obtained from the following equation (B2).

$$Yavg = \frac{a_k(-1) \times Y(-1) + a_k(0) \times Y(0) + a_k(1) \times Y(1)}{\sum_{t=-1}^{1} a_k(t)} \quad (B2)$$

In equation (B2), Y(−1), Y(0), and Y(1) respectively indicate the luminance signals of the pixel one pixel after the pixel to be corrected, the pixel to be corrected, and the pixel one pixel before the pixel to be corrected. If the coefficients $a_k(-1)$, $a_k(0)$, and $a_k(1)$ are all one ($a_k(-1)=a_k(0)=a_k(1)=1$), the denominator in equation (B2) is given by the following equation (B2a), and equation (B2) represents the calculation of a simple mean value.

$$\sum_{t=-1}^{1} a_k(t) = a_k(-1) + a_k(0) + a_k(1) = 3 \quad (B2a)$$

Therefore, equation (B2) gives the average luminance of the pixel to be corrected and its neighboring pixels. The pixels neighboring the pixel to be corrected include, if i is a given integer, pixels from the pixel i pixels before the pixel to be corrected to the pixel one pixel before the pixel to be corrected, and pixels from the pixel one pixel after the pixel to be corrected to the pixel i pixels after the pixel to be corrected. If the integer i is one, the pixels neighboring the pixel to be corrected are the pixel one pixel before the pixel to be corrected, and the pixel one pixel after the pixel to be corrected.

As noted in regard to Embodiment A1, the filter output of the luminance detection means 131 in a one-dimensional direction of the luminance signal Y can be determined by use of a one-dimensional finite impulse response digital filter configuration that generates output represented by equation (B2). By configuring the filter output to calculate the mean value of the luminance signal Y and the pixels neighboring the pixel to be corrected, it is possible to determine changes in the brightness distribution in the one-dimensional direction. Accordingly, correction gains corresponding to the changes in the brightness distribution can be found and the signal contrast can be corrected according to the changes in the brightness distribution. This configuration, which is common in digital signal processing circuits, can reduce circuit size, number of gates, and cost.

As also noted in regard to Embodiment A1, the tap count n is not limited to three but may have any value. Increasing the tap count enables fine-tuned setting of cut-off frequency characteristics and detection of gradual luminance changes over a wide range. Switching the tap count n in this way allows an optimal filter means 132 to be configured according to changes in luminance distribution due to different lighting conditions in the input image.

As also noted in regard to Embodiment A1, the filter means 132 may be a two-dimensional finite impulse response digital filter. Using a two-dimensional finite impulse response digital filter enables detection of regional luminance changes in the input image.

As also noted in regard to Embodiment A1, the filter means 132 need not necessarily be configured to calculate the average luminance Yavg using the above equation (B2); it may have any configuration that enables changes in the brightness distribution to be determined, so it may be configured to output weighted average values or may be configured using a low-pass filter or a bandpass filter.

Next, the correction gain calculation means 104 calculates and outputs a correction gain $G_k$ based on the average luminance signal Yavg output from the luminance filtering means 103, in an operation similar to that conducted by the correction gain calculation means 3 in Embodiment A1. The correction gain calculation means 104 calculates the correction gain $G_k$ from, for example, the following equation (B3).

$$G_k = \frac{Gmax}{1 + (Gmax - 1) \times \frac{Yavg}{Ymax}} \quad (B3)$$

In equation (B3), Yavg indicates the average luminance output from the filter means 132 and input to the correction gain calculation means 104, Gmax indicates the maximum value of the correction gain (maximum gain), and Ymax indicates the maximum luminance output from the filter means 132 (the maximum value in the range of values that the output of the filter means 132 can take).

The maximum luminance Ymax is unambiguously determined by the digital resolution (the number of gradation levels) of the imaging signal. For an eight-bit gradation scale, the maximum luminance Ymax is 255; for a ten-bit gradation scale, the maximum luminance Ymax is 1023.

When the correction gain $G_k$ is calculated by equation (B3), the maximum value Gmax can be determined according to the image quality of the image, and fine-tuned optimal image quality improvement can be carried out. For example, by use of a change in the luminance over a relatively wide region (a luminance change with low spatial frequency), such as a luminance distribution due to illumination on the screen, for example, the luminance component of the illumination can be corrected to improve contrast and visibility.

For example, the maximum gain decision means 113 can calculate or determine the maximum correction gain Gmax by performing an image analysis of the corrected imaging signal Xb output from the gain correction means 102 and detecting the areal distribution of dark signal quantities in the captured picture. For example, the percentage of the area that has consecutive dark pixels (for example, pixels at which the luminance signal is 10% of Ymax or less) in the whole imaging screen is calculated, and when the percentage of the dark area exceeds a predetermined threshold (e.g., 5%), Gmax is calculated (for use in place of the predetermined value). Gmax can be calculated according to, for example, the equation:

$$Gmax = Ytg/Ydk$$

where Ytg is a prescribed signal level that may be set at 50% of Ymax, for example. Ydk is the mean luminance of the dark area, that is, the area in which the luminance signal is 10% of Ymax or less.

When the percentage of the dark area in the imaging screen is less than the predetermined threshold (e.g., 5%), the predetermined Gmax is used without carrying out the above calculation.

The numerical values used here (the above '10%' value defining dark areas, the '5%' value expressing the prescribed value, and the '50%' value of the prescribed signal level Tg) are derived experimentally, empirically, and statistically, and may be changed according to the characteristics of the display device and the configuration of the image processing circuit etc.

Instead of determining Gmax by calculation as described above, it is possible to display the imaging result on a display means provided downstream of the imaging apparatus, observe the displayed image, and determine Gmax by sensory judgement.

Alternatively, Gmax can be determined more precisely by carrying out an advanced information analysis based on the corrected imaging signal Xb, such as a histogram analysis of its luminance distribution, a regional luminance distribution analysis of the image, a color information analysis of the sky and human skin, for example, or a pattern analysis of shapes etc.

Values calculated in the imaging apparatus by the type of image analysis mentioned above and stored in the imaging apparatus may be used as the maximum gain Gmax, or an interface may be configured to control the maximum gain Gmax from a host system including the imaging apparatus, and the Gmax value may be switched from the host system.

Exemplary host systems include an image analysis apparatus that analyzes an image captured by the imaging apparatus based on the imaging signal Xb, and a feature point detection device that extracts or detects a subject's feature points from an image captured by the imaging apparatus. From a captured landscape image, for example, an image analysis apparatus may analyze the signals of bright parts such as the sky or an outdoor scene viewed from a window and the signals of dark parts such as an indoor scene or the shadow of a mountain, and set Gmax so as to improve the quality of the captured image.

A feature point detection device will set Gmax for optimal detection of feature points of a subject.

By such use of a host system, a high precision system that can provide optimal image quality improvement for the host system can be configured.

The correction gain $G_k$ output from the correction gain calculation means 104 is as shown in FIGS. 3 and 4.

As shown in FIGS. 3 and 4, when the maximum gain Gmax is greater than one, as the average luminance normalized by the maximum luminance (Yavg/Ymax) increases (accordingly, as the average luminance Yavg increases), the correction gain $G_k$ decreases from the maximum gain Gmax, and when the average gain Yavg becomes equal to the maximum luminance Ymax (when Yavg/Ymax=1), the correction gain $G_k$ becomes equal to unity. Furthermore, if the maximum gain Gmax is one, the correction gain $G_k$ is a unity gain.

Although the correction gain calculation means 104 has been described as being configured to obtain the correction gain $G_k$ by executing the calculation in equation (B3), it may also pre-store the correction gain $G_k$ corresponding to the average luminance Yavg as a lookup table (LUT). If this type of lookup table is used, division processing becomes unnecessary, so the calculation processing in the correction gain calculation means 104 can be simplified.

Figure 24:
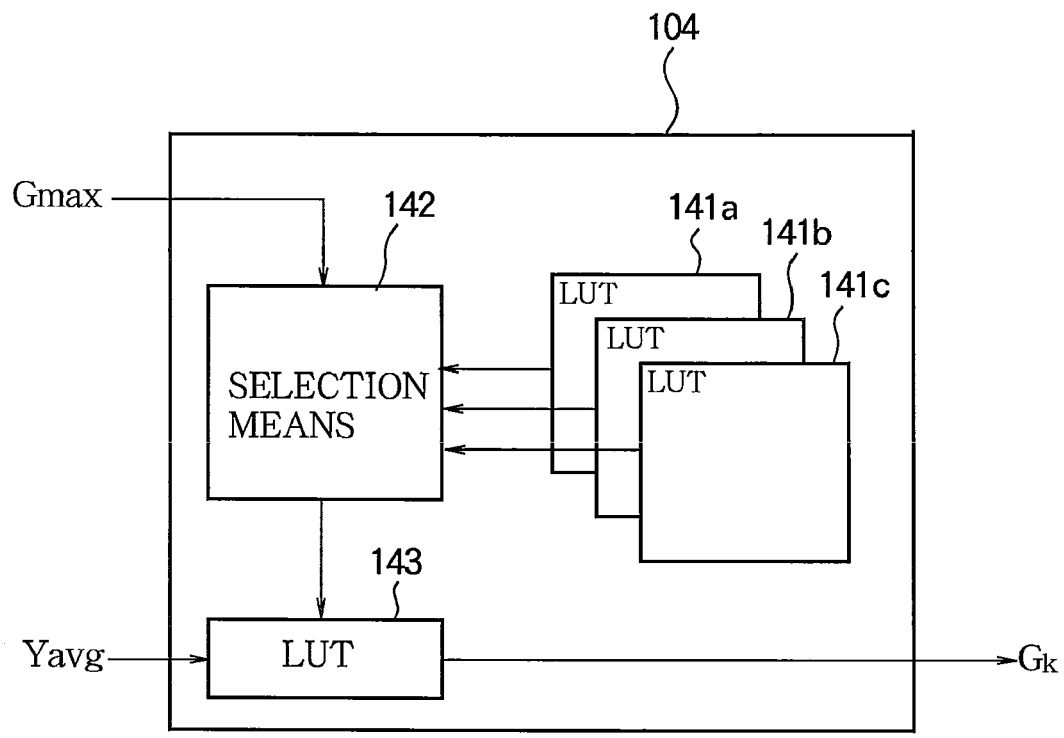
FIG. 24 is a block diagram showing an example of a correction gain calculation means used in Embodiment B1.

FIG. 24 shows a block diagram of a configuration using LUTs. This configuration comprises a plurality of LUTs: LUT 141a, 141b, 141c, each corresponding to a different value of Gmax. The configuration further comprises a selection means 142 that selects the one of these LUTs 141a, 141b, 141c that is suited to the value of Gmax, and a LUT 143 that stores the content of the LUT selected by the selection means 142. LUT 143 then outputs the correction gain $G_k$ according to the input average luminance Yavg.

The LUTs 141a, 141b, 141c in the correction gain calculation means 104 in FIG. 24 store correction gains $G_k$ corresponding to the average luminance Yavg for different values of Gmax. LUT 143 is configured to receive the average luminance Yavg and output a corresponding correction gain $G_k$.

By configuring the correction gain calculation means 104 with LUTs, multiplying means and dividing means can be dispensed with, with such effects as a reduced number of gates and shortened processing time.

Figure 25:
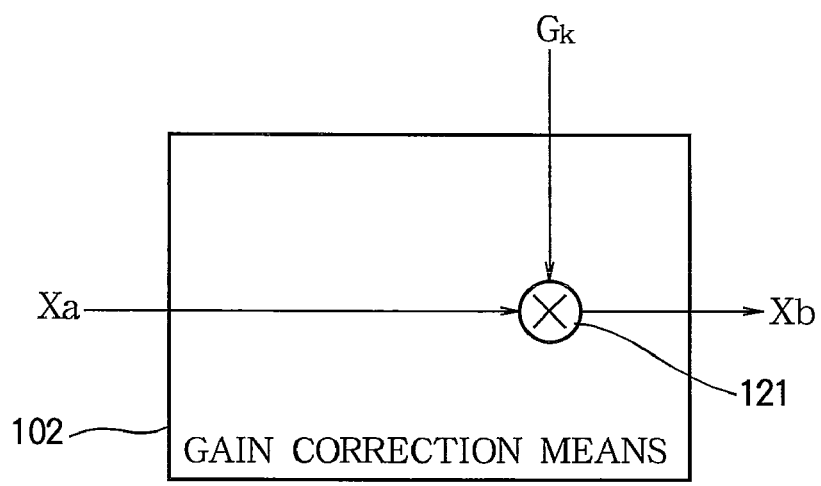
FIG. 25 is a block diagram showing an example of a gain correction means used in Embodiment B1.

FIG. 25 shows an example of the gain correction means 102 in FIG. 20. The gain correction means 102 in FIG. 25 comprises a multiplying means 121, receives the correction gain $G_k$ output from the correction gain calculation means 104, multiplies the imaging signal Xa from the camera signal processing means 108 by the correction gain $G_k$, and outputs imaging signal Xb. Imaging signal Xb is calculated by the following equation.

$$Xb = G_k \times Xa$$

The correction gain $G_k$ is set so that imaging signal Xb is a monotonically increasing function of imaging signal Xa, not reflecting magnitude relationships between signal values at adjacent pixels and not reversing gradation level relationships, thereby preventing deterioration of the quality of the image.

The multiplying means 121 in FIG. 25 corresponds to the operation means 4 of FIG. 1 and has same function.

A graph of values obtained by multiplying average luminance values normalized by the maximum luminance by the correction gain used in Embodiment B1 appears as shown, for example, in FIG. 5.

The correction gain $G_k$ here is a value determined so that the product $G_k \times Yavg/Ymax$ is a monotonically increasing function. FIG. 5 shows this product $G_k \times Yavg/Ymax$ of the correction gain when the maximum gain Gmax has values of 1, 3, and 5. A corrected luminance based on a calculation other than $G_k \times Yavg/Ymax$ may be used for the corrected luminance. As can be seen from FIG. 5, when the maximum gain Gmax is unity (1), the imaging signal Xa is output without change.

As can be seen from FIG. 5, as the maximum gain Gmax increases, the slope increases on the low-luminance side and decreases on the high-luminance side. By increasing the slope on the low-luminance side, it is possible to improve the contrast of low-luminance parts by amplified output of the low-level part of the signal, which is susceptible to black collapse. By making the slope on the high-luminance side about 1.0 less than the slope on the low-luminance side, it is possible to maintain the luminance and contrast of the signal on the high-luminance side. It is thereby possible to prevent the problem of white collapse on the high-luminance side and obtain a signal with high contrast in the high- and low-luminance parts of the signal, improving its visibility.

Figure 26:
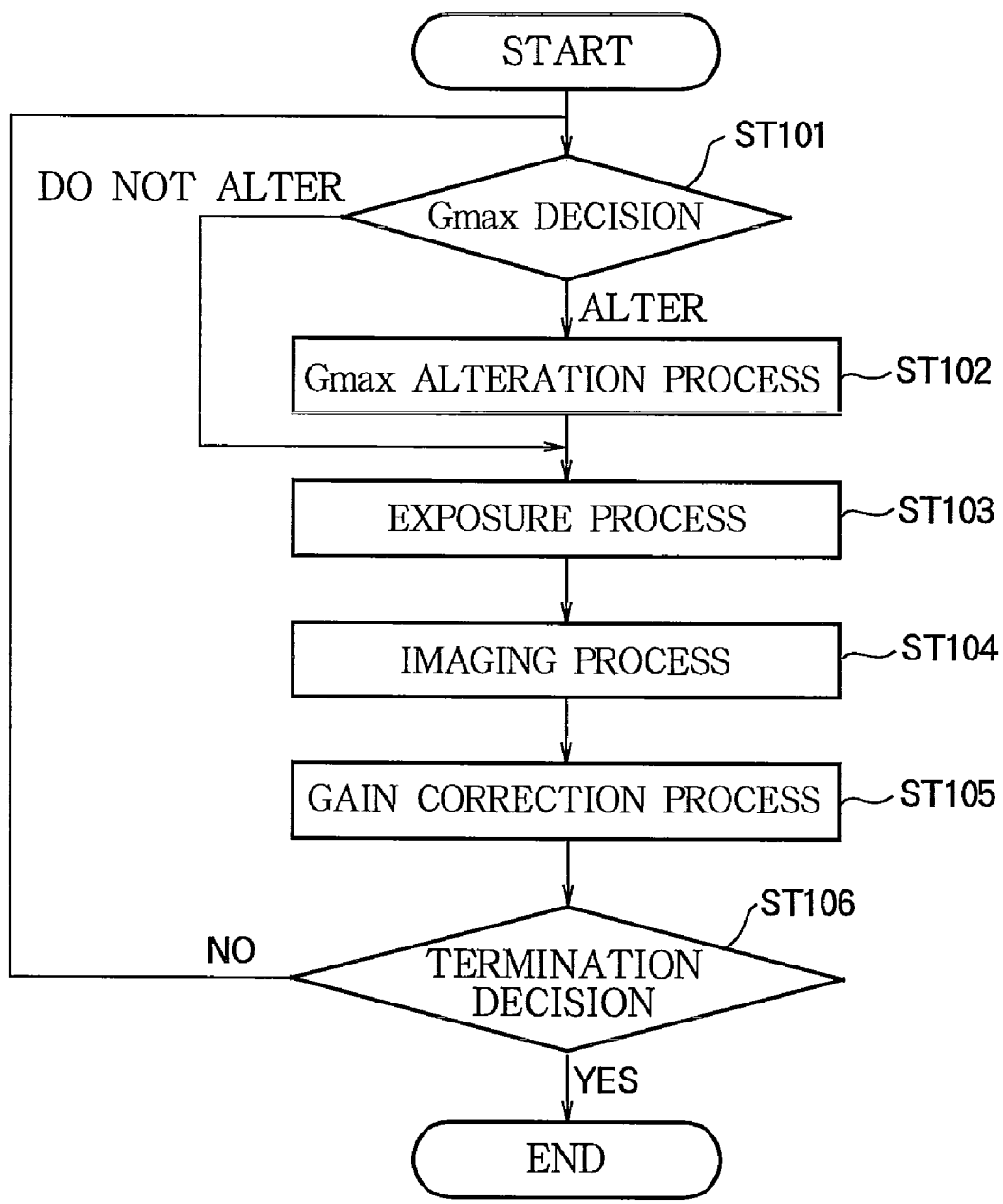
FIG. 26 is a flowchart illustrating the operation of the imaging apparatus according to Embodiment B1.
Figure 27:
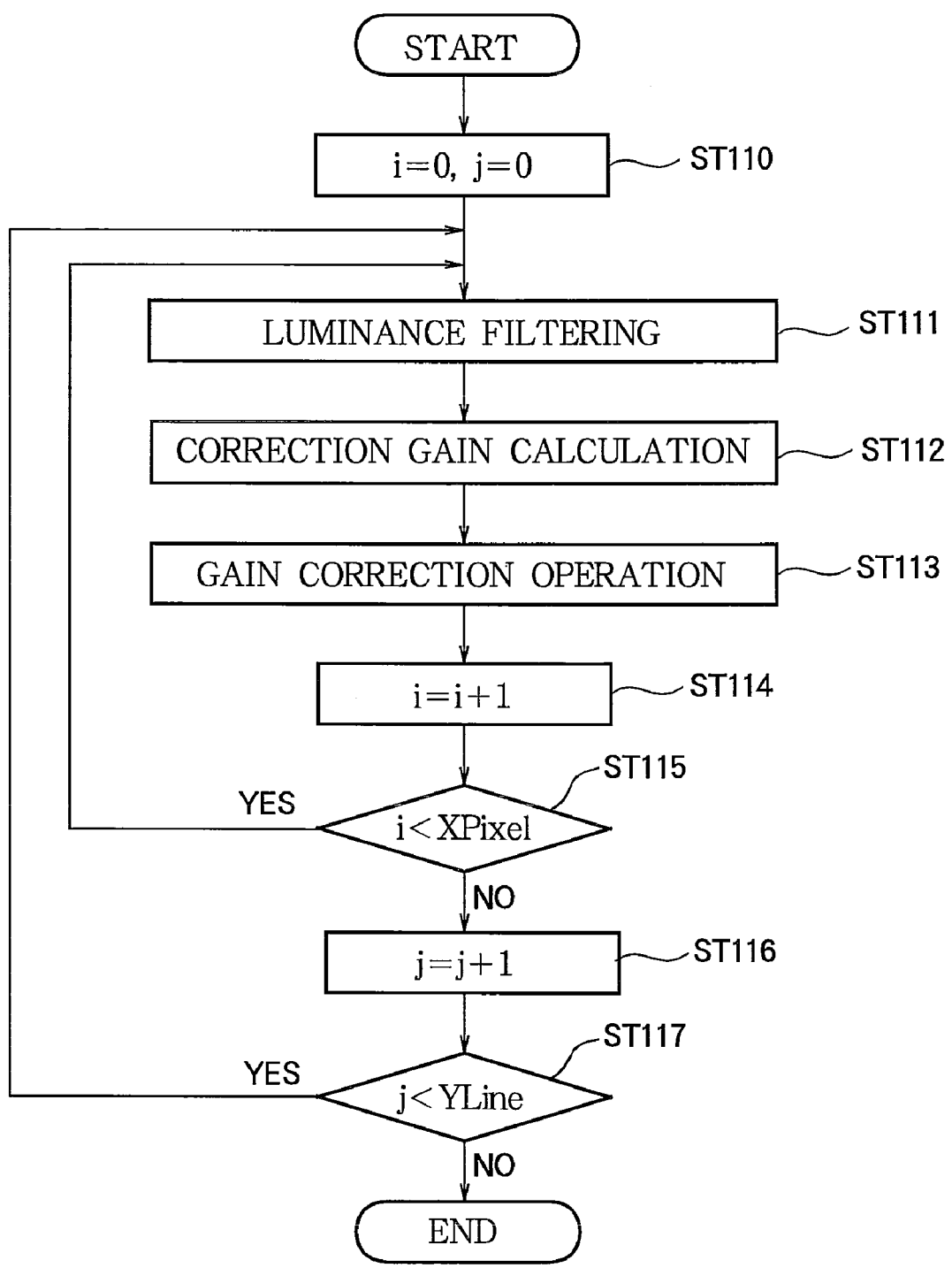
FIG. 27 is a flowchart illustrating details of the gain correction process (ST105) in FIG. 26.

The processing procedure will be described below with reference to FIGS. 26 and 27. FIG. 26 is a flowchart illustrating the overall processing procedure of the imaging apparatus. FIG. 27 is a flowchart illustrating the details of the gain correction process (ST105) in FIG. 26.

As shown in FIG. 26, the imaging apparatus of Embodiment B1 carries out a Gmax decision process (ST101), a Gmax alteration process (ST102), an exposure process (ST103), an imaging process (ST104), a gain correction process (ST105), and a termination decision (ST106).

In step ST101, it decides whether an alteration of Gmax is necessary. At power-up, there is no need for such alteration; a prescribed initial value is output. After power-up, Gmax is altered when a Gmax alteration request arises. A Gmax alteration request may arise as a result of image analysis etc., or a Gmax alteration request may be received from a host system.

If a Gmax alteration is found necessary in step ST101, the Gmax alteration process in step S102 is performed. In the Gmax alteration process, the initial value or the value of Gmax currently stored is replaced with a new Gmax value. If Gmax alteration is not requested in step ST101, the process proceeds to step ST103 without the processing in step ST102.

The exemplary configuration shown in FIG. 26 includes a Gmax decision process (ST101) and a Gmax alteration process (ST102). However, for still-picture photography or in cases in which the initial value of Gmax can be used without change, these processes (the processes in steps ST101 and ST102) can be dispensed with.

In the exposure process in step ST103, the exposure condition of the subject is determined from the captured image to determine a first exposure value E1, and a second exposure value E2 is determined from Gmax and the first exposure value E1.

In addition, the charge accumulation time S and gain G of the imaging element 105 are adjusted on the basis of the first exposure value E1 or the second exposure value E2.

Switching between the first exposure value E1 and the second exposure value E2 is controlled by a control means (not shown) in the imaging apparatus, or a system control means in an external system. The control means may comprise, for example, a microcontroller.

As one example, to set an optimal exposure correction in still-picture photography, the exposure may be set to the first exposure value E1, an image may be captured without carrying out the maximum correction gain Gmax alteration process (ST102) and the gain correction process (ST105) described below, the maximum correction gain Gmax and exposure correction value Kd may be calculated from the resultant image, and these values may be used to calculate the second exposure value E2, which can then be used for the imaging of subsequent frames.

In the imaging process in step ST104, the exposure is controlled based on the exposure value (the first exposure value E1 or the second exposure value E2) obtained in the exposure process (ST103), imaging is carried out, and an imaging signal is output.

In the gain correction process (ST105), the correction gain $G_k$ of the imaging signal obtained in imaging process (ST104) is calculated for each pixel, and the corrected imaging signal Xb is calculated by multiplying the imaging signal Xa (signal of each pixel) by the correction gain $G_k$.

In the termination decision process ST106, whether to terminate imaging or not is decided. If the decision is not to terminate imaging, the processing returns to step ST101.

One example of the details of the gain correction process (ST105) is shown in FIG. 27. In the steps shown in FIG. 27, the purpose of steps ST110, ST114, ST115, ST116, and ST117 is to carry out the processing of one frame in chronological order: 'j' in steps ST110, ST116, and ST117 indicates the number of the line to which the pixel to be processed belongs; 'i' in steps ST110, ST114, and ST115 indicates the number of the pixel the line. XPixel in step ST115 represents the number of pixels per line, while YLine in step ST117 represents the number of lines per screen.

If the image data to be processed are stored in a memory, the processing does not have to be carried out in chronological order, so only the processes from step ST111 to ST113 are necessary.

In step ST110, the pixel number i and line number j are set to initial values (0). The luminance filtering step ST111 performs the same process as the luminance filtering means 103 to calculate the average luminance Yavg of a pixel and its neighboring pixels.

The correction gain calculation step ST112 performs the same process as the correction gain calculation means 104 to calculate the correction gain $G_k$ from the average luminance Yavg calculated in the luminance filtering process step ST111.

In the gain correction operation step ST113, the corrected imaging signal (the data of each pixel) Xb is calculated by multiplying imaging signal Xa (the data of each pixel) by the correction gain $G_k$ calculated in the correction gain calculation step ST112.

In step ST114, the pixel number i is incremented by one. In step ST115, if i is less than XPixel, the processing returns to step ST111; otherwise, the processing proceeds to step ST116.

In step ST116, the line number j is incremented by one. In step ST117, when j is smaller than YLine, the process returns to step ST111; otherwise, the processing ends.

Figure 28:
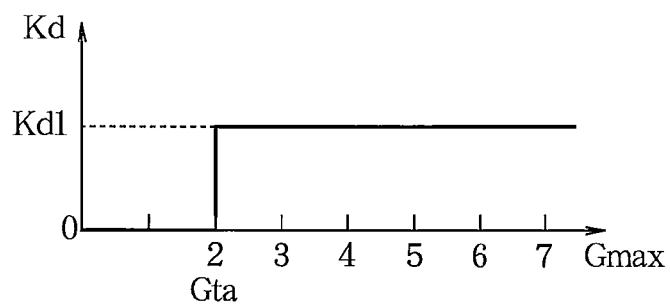
FIG. 28 is a graph showing an exemplary relation of the exposure correction value to the maximum correction gain, which is used by the offset subtraction means 10 in Embodiment B1.

FIG. 28 shows an exemplary relation between Gmax and the exposure correction value Kd used in obtaining the second exposure value E2.

In the illustrated example, Kd=0 when Gmax is less than a certain threshold Gta (Gta=2 in the drawing), while Kd=Kd1 (a certain positive real number) when Gmax is equal to or greater than the threshold Gta (=2).

The second exposure value E2 can be calculated from the first exposure value E1 and exposure correction value Kd according to the following equation (B4).

$$E2 = Ke \times E1 \times (1/2)^{\wedge} Kd \quad (B4)$$

(where Ke is a correction coefficient having a positive real value. The '^' indicates that the following symbol Kd represents an exponent. The same notation will be used below).

The higher the value of Kd is, the lower the value of the second exposure value E2 calculated by the above equation becomes.

The correction coefficient Ke may normally be equal to unity (1), but in some imaging apparatus configurations, an empirically obtained constant should be used. Alternatively, an image analysis of the imaging conditions may be carried out and the value of the correction coefficient Ke may be switched according to the condition of the luminance level in the image.

In FIG. 28, as stated above, if the maximum gain Gmax is equal to or greater than a predetermined threshold value Gta (=2) then Kd=Kd1, and if Gmax is less than the threshold value Gta (=2) then Kd=0.

Setting Kd=0 makes the first exposure value and the second exposure value proportional functions.

When Kd is 2 or more, the second exposure value obtained from $$E2 = Ke \times E1 \times (1/2)^{\wedge} Kd1$$

is used. The exposure is thereby stopped down, and the exposure condition becomes darker.

Although the threshold value Gta for switching the exposure correction value Kd is set at '2' here, it need only be equal to or greater than '1', with Kd being set equal to '0' when Gmax is less than Gta. When Gmax is equal to or greater than the threshold Gta, Kd is set to a positive real number to stop down the exposure. By adjusting the exposure correction value Kd in accordance with Gmax, white collapse and poor contrast in bright areas can be mitigated with improved visibility in dark areas.

Figure 29:
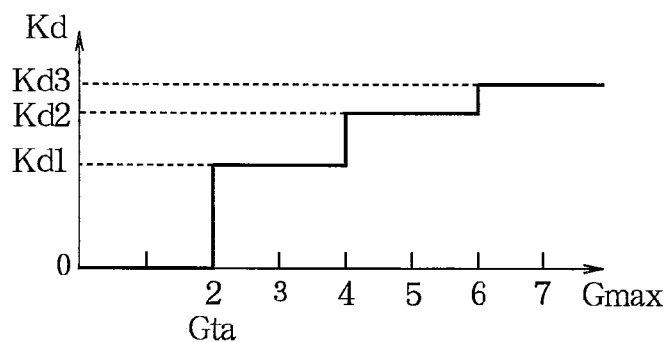
FIG. 29 is a graph showing another exemplary relation of the exposure correction value to the maximum correction gain, which is used by the offset subtraction means 10 in Embodiment B1.
Figure 30:
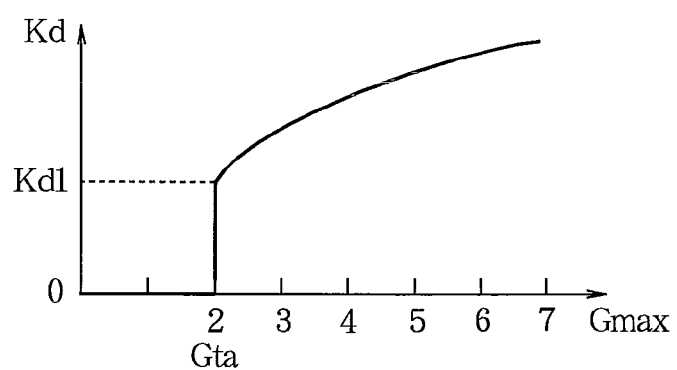
FIG. 30 is a graph showing yet another exemplary relation of an exposure correction value to the maximum correction gain, which is used by the offset subtraction means 10 in Embodiment B1.

The exposure correction value Kd may be obtained from the relation shown in FIG. 29 or FIG. 30 instead of from the relation shown in FIG. 28.

In the example shown in FIG. 29, in the range in which Gmax is equal to or greater than Gta, the exposure correction value Kd increases in a series of steps as Gmax increases.

In the example shown in FIG. 30, in the range in which Gmax is equal to or greater than Gta, the exposure correction value Kd increases continuously as Gmax increases.

It is also possible to use a configuration that switches dynamically between mutually differing relations, such as the relations shown in FIGS. 28, 29, and 30. By use of a configuration in which the exposure correction value is varied as shown in FIG. 29 or FIG. 30, or a configuration that switches dynamically among mutually differing relations such as the ones shown in FIGS. 28, 29 and 30, an exposure correction value Kd optimal for the image can be determined, providing improved image quality and visibility after the correction.

In the relation between Gmax and Kd shown in FIG. 28, the value of Kd in the range in which Gmax is equal to or greater than Gta is fixed at Kd1. Alternatively, the value of Kd can be modified based on a histogram of the signal level of the imaging signal Xa.

Figure 31:
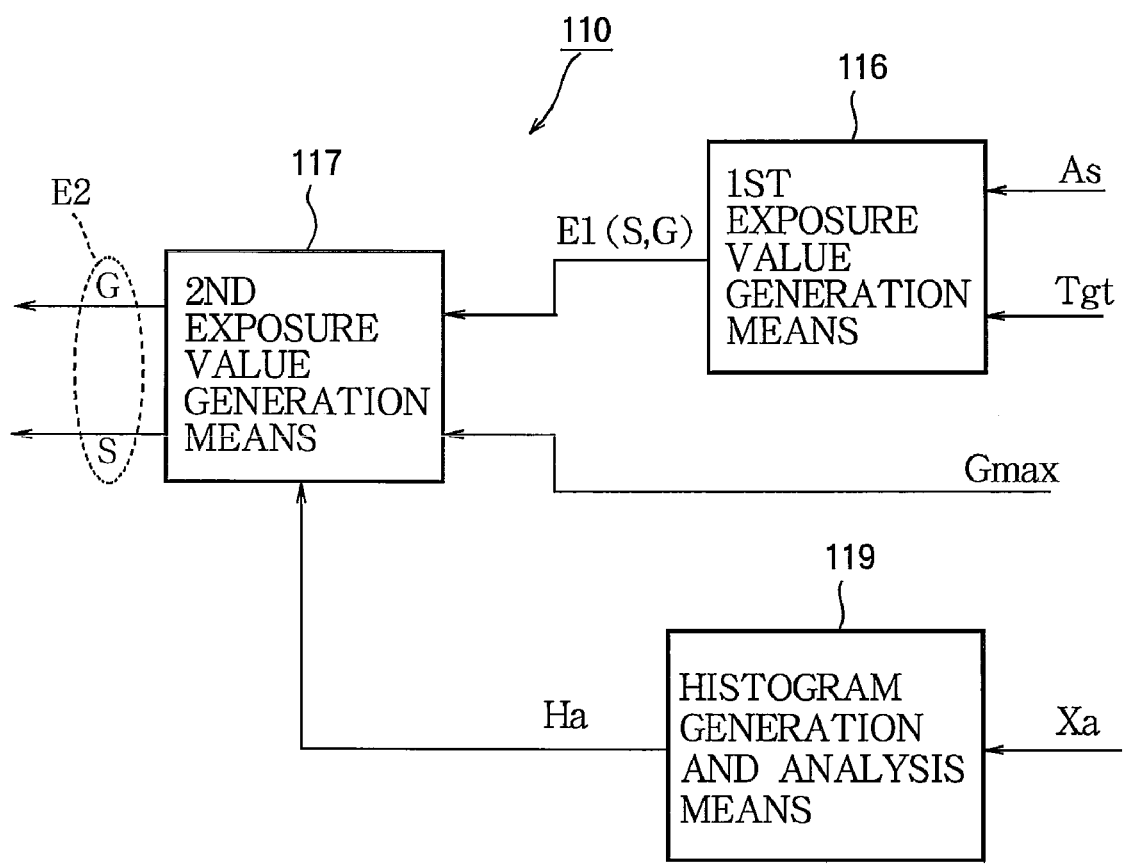
FIG. 31 is a block diagram showing another example of the exposure control means used in Embodiment B1.

FIG. 31 shows the exposure control means 110 used in this case. The exposure control means 110 in the figure is substantially same as the exposure control means 110 shown in FIG. 21, except that the exposure control means 110 comprises a histogram generation and analysis means 119. The histogram generation and analysis means 119 receives the imaging signal Xa, generates and analyzes a histogram therefrom, and outputs the result of the analysis Ha. The second exposure value generation means 117 generates the second exposure value E2 from the first exposure value E1, the maximum correction gain Gmax, and the result Ha of the analysis of the histogram obtained by the histogram generation and analysis means 119.

Figure 32:
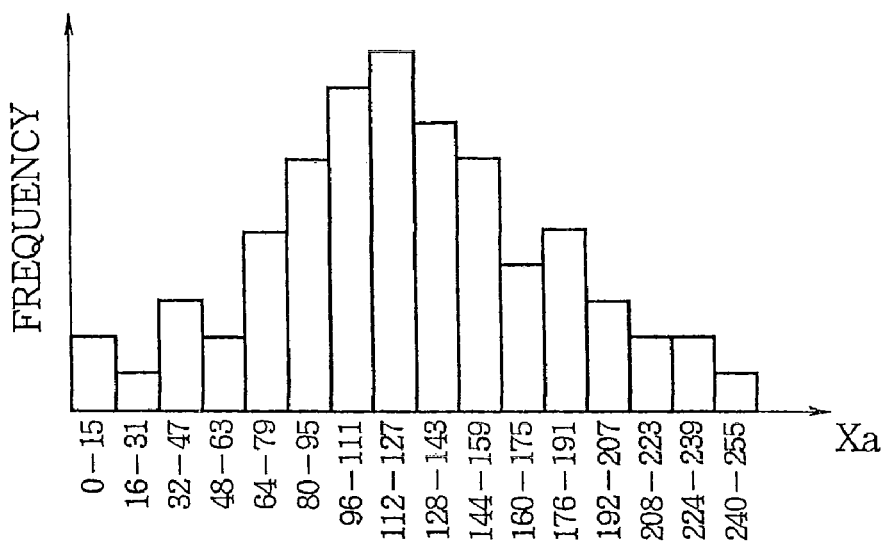
FIG. 32 is an exemplary histogram of an imaging signal.
Figure 33:
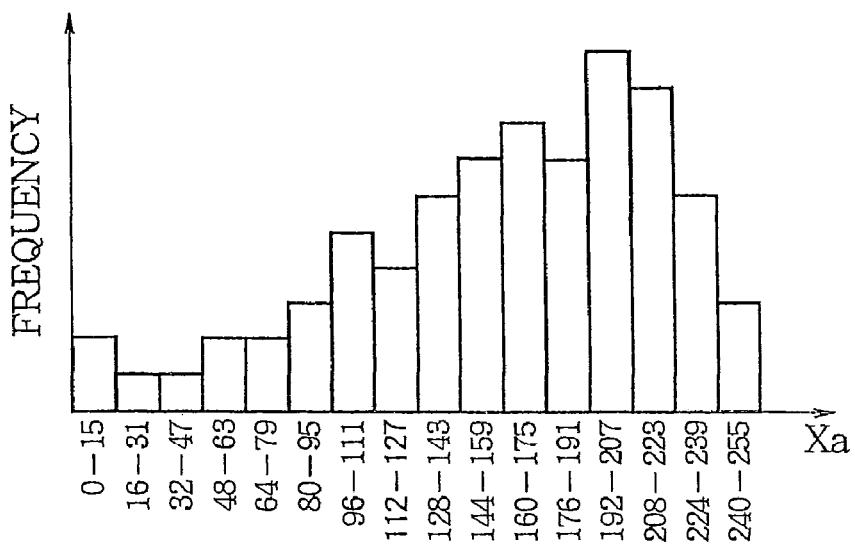
FIG. 33 is another exemplary histogram of an imaging signal.
Figure 34:
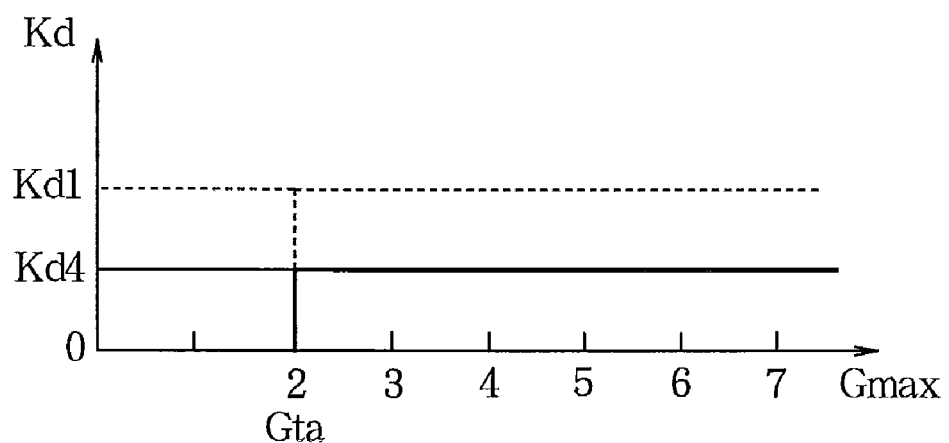
FIG. 34 is a graph showing still another exemplary relation of the exposure correction value to the maximum correction gain, which is used by the offset subtraction means 10 in Embodiment B1.

FIGS. 32 and 33 show two different exemplary histograms. In the example in FIG. 32, the imaging signal Xa is mostly distributed around the center. In this case, the exposure correction value Kd is set to a comparatively low value, and the second exposure value E2 given by the equation (B4), for example, takes on a comparatively high value. FIG. 34 shows an exemplary setting of the exposure correction value Kd to a comparatively low value. The value Kd4 (solid line) used in the example shown here is lower than the value Kd1 (dotted line) that was shown in FIG. 28. By using a comparatively low exposure correction value Kd and thus using a comparatively high exposure value, although there is a slight compression of the high luminance part of the signal, it is possible to execute a luminance correction on areas of intermediate and dark gradation, which have high information content.

Figure 35:
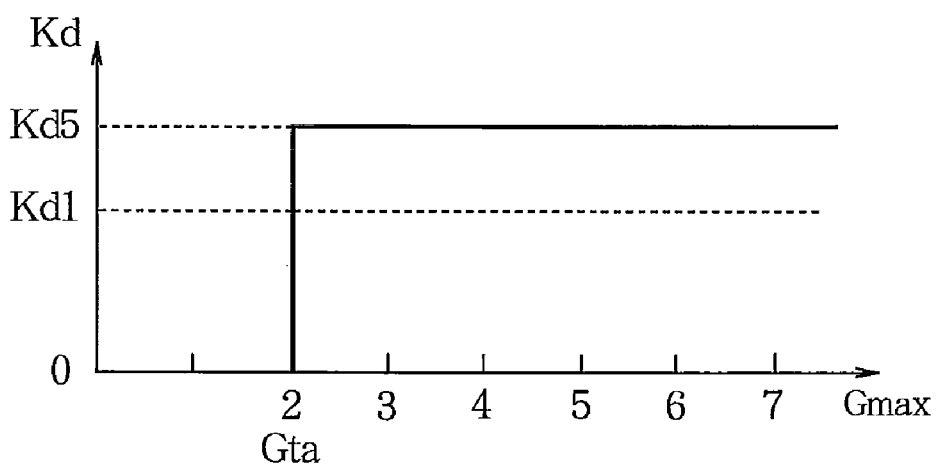
FIG. 35 is a graph showing yet another exemplary relation of an exposure correction value to the maximum correction gain, which is used by the offset subtraction means 10 in Embodiment B1.

When the signal has predominantly high luminance as shown in FIG. 33, the exposure correction value Kd is set to a comparatively high value, so that the second exposure value E2 given by equation (B4), for example, will have a smaller value. FIG. 35 shows an example in which the exposure correction value Kd is set comparatively high. The value Kd5 (solid line) used in the example shown is higher than Kd1 (dotted line), which is the same as shown in FIG. 28. By using a comparatively high exposure correction value Kd and thus a comparatively low exposure value, it is possible to avoid a reduction in the information content of high luminance areas caused by compression of those areas.

By switching the exposure correction value Kd in this way, based on the result of the histogram analysis Ha, it is possible to set the exposure value more precisely, resulting in improved visibility. The exposure correction value may also be switched by using the result of a type of image analysis other than histogram analysis.

Alternatively, not only the exposure correction value but also the correction gain may be controlled based on the result of histogram analysis or other image analysis.

The image before correction by the imaging apparatus according to Embodiment B1 is, for example, as shown in FIG. 6 and the image after correction is, for example, as shown in FIG. 7.

FIG. 6 indicates that the bright area, that is, the scenery outside the window (the part designated by the reference characters DS1) is reproduced vividly, but that dark areas, such as the person HD1 inside the room, are in a state close to black collapse.

The processing of the area in which the captured image is bright (the area DS1 in FIG. 6 in which one can see outside the room through the window) in the imaging apparatus according to Embodiment B1 will be described with reference to FIGS. 8($a$) and 8($b$). The normalized luminance Xin/Ymax ('input luminance signal') and normalized average luminance Yavg/Ymax of the imaging signal Xa from pixel position p0 to pixel position p6 before gain correction are as shown in FIG. 8($a$). The normalized input luminance signal Xin/Ymax and normalized luminance signal Xout/Ymax ('output luminance signal') after gain correction of the imaging signal Xb from the same pixel position p0 to pixel position p6 as in FIG. 8($a$) are as shown in FIG. 8($b$).

As shown by the dotted line in FIG. 8($a$), the normalized input luminance signal Xin/Ymax is 0.6 at pixel position p1, 0.7 at pixel position p2, 0.8 at pixel position p3, 0.7 at pixel position p4, 0.8 at pixel position p5, and 0.6 at pixel position p6.

Accordingly, if the tap count n is three, the normalized average luminance Yavg/Ymax is 0.66 at pixel position p1, 0.70 at pixel position p2, 0.73 at pixel position p3, 0.76 at pixel position p4, 0.70 at pixel position p5, and 0.70 at pixel position p6, as shown by the solid line in FIG. 8($a$).

If the maximum gain Gmax is 3, from the calculated average luminance Yavg and equation (B3), the correction gain $G_k$ is 1.29 at pixel position p1, 1.25 at pixel position p2, 1.22 at pixel position p3, 1.19 at pixel position p4, 1.25 at pixel position p5, and 1.25 at pixel position p6. Thus the correction gain $G_k$ of each pixel can be calculated by calculating the average luminance Yavg of each pixel.

FIG. 8($b$) is a graph showing the normalized input luminance signal Xin/Ymax and normalized output luminance signal Xout/Ymax from the same pixel position p0 to pixel position p6 as in FIG. 8($a$). As shown by the dotted line in FIG. 8($b$), the normalized input luminance signal Xin/Ymax is 0.6 at pixel position p1, 0.7 at pixel position p2, 0.8 at pixel position p3, 0.7 at pixel position p4, 0.8 at pixel position p5, and 0.6 at pixel position p6.

The gain-corrected output image signal Xout(M, N) at the pixel with coordinates (M, N) can be calculated as in the following equation (B5) from the input luminance signal Xin(M, N) at the pixel with coordinates (M, N) and the gain $G_k$.

$$Xout(M,N) = G_k \times Xin(M,N) \quad (B5)$$

As shown by the solid line in FIG. 8(b), the normalized output luminance signal Xout/Ymax is 0.77 at pixel position p1, 0.88 at pixel position p2, 0.98 at pixel position p3, 0.83 at pixel position p4, 1.00 at pixel position p5, and 0.75 at pixel position p6.

When the input image is an RGB signal, the following equations (B6a), (B6b), (B6c) hold in general.

$$Rb(M,N) = G_k \times Ra(M,N) \quad (B6a)$$

$$Gb(M,N) = G_k \times Ga(M,N) \quad (B6b)$$

$$Bb(M,N) = G_k \times Ba(M,N) \quad (B6c)$$

Rb(M, N) is the gain-corrected R signal (the output R signal) at the pixel with coordinates (M, N), Ra(M, N) is the R signal at the pixel with coordinates (M, N) before gain correction (the input R signal), Gb(M, N) is the gain-corrected G signal (the output G signal) at the pixel with coordinates (M, N), Ga(M, N) is the input G signal at the pixel with coordinates (M, N) before correction (the input G signal), Bb(M, N) is the gain-corrected B signal (the output B signal) at the pixel with coordinates (M, N), and Ba(M, N) is the input B signal at the pixel with coordinates (M, N) before gain correction (the input B signal).

When the input image is a YCbCr signal, the following equations (B7a), (B7b), (B7c) hold in general.

$$Yb(M,N) = G_k \times Ya(M,N) \quad (B7a)$$

$$Cbb(M,N) = G_k \times (Cba(M,N) - Cbof) + Cbof \quad (B7b)$$

$$Crb(M,N) = G_k \times (Cra(M,N) - Crof) + Crof \quad (B7c)$$

Yb (M, N) is the gain-corrected luminance signal (the output luminance signal) at the pixel with coordinates (M, N), Ya (M, N) is the input luminance signal at the pixel with coordinates (M, N) before gain correction (the input luminance signal), Cbb(M, N) and Crb(M, N) are the gain-corrected color difference signals at the pixel with coordinates (M, N), Cba (M, N) and Cra (M, N) are the input color difference signals at the pixel with coordinates (M, N) before correction (the input color difference signals), and Cbof and Crof are offsets in the signal processing of the color difference signals.

As shown in equations (B6a), (B6b), (B6c), the dynamic range can be improved without skewing the white balance in local areas by multiplying the RGB signals uniformly by the same correction gain $G_k$.

The normalized input luminance signal Xin/Ymax and the normalized average luminance Yavg/Ymax from pixel position q0 to pixel position q6 in relation to the processing of the dark area (area of low luminance) HD1 in the imaging apparatus according to Embodiment B1 are, for example, as shown in FIG. 9(a), and the normalized input luminance signal Xin/Ymax and the normalized output luminance signal Xout/Ymax from the same pixel position q0 to pixel position q6 as in FIG. 9(a) are, for example, as shown in FIG. 9(b).

As shown by the dotted line in FIG. 9(a), the normalized input luminance signal Xin/Ymax is 0.1 at pixel position q1, 0.2 at pixel position q2, 0.3 at pixel position q3, 0.2 at pixel position q4, 0.3 at pixel position q5, and 0.1 at pixel position q6 in the low luminance region HD1. As shown by the solid line in FIG. 9(a), the normalized average luminance Yavg/Ymax is 0.16 at pixel position q1, 0.20 at pixel position q2, 0.23 at pixel position q3, 0.26 at pixel position q4, 0.20 at pixel position q5, and 0.20 at pixel position q6. The correction gain $G_k$ is 2.25 at pixel position q1, 2.14 at pixel position q2, 2.05 at pixel position q3, 1.97 at pixel position q4, 2.14 at pixel position q5, and 2.14 at pixel position q6.

The gain-corrected output signal Xout at each pixel is 0.23 at pixel position q1, 0.43 at pixel position q2, 0.62 at pixel position q3, 0.39 at pixel position q4, 0.64 at pixel position q5, and 0.21 at pixel position q6, as shown by the solid line in FIG. 9(b).

As can be seen from FIG. 8(b), in the bright area DS1, the correction gain is approximately 1.2 and an output image with substantially the same signal level as the input image is output. The contrast at the level of individual pixels is thereby preserved in the bright areas. As can be seen from FIG. 9(b), however, in the dark area HD1 the correction gain is approximately 2. This indicates that the signal level which was compressed at the black level has become brighter and the contrast at the individual pixel level in the dark areas is amplified.

As explained above, the dynamic range can be improved so as to enhance the clarity of the dark area HD1 (HD2 in FIG. 7) while maintaining the existing contrast in the bright area DS1 (DS2 in FIG. 7) by calculating a correction gain $G_k$ for each pixel from the average luminance Yavg and multiplying each pixel in the image signal by the correction gain $G_k$.

The histogram of the frequency of occurrence of each luminance level in the imaging signal before gain correction is, for example, as shown in FIG. 10; the histogram of the frequency of occurrence of each luminance level in the improved image (imaging signal after gain correction) is, for example, as shown in FIG. 11; FIGS. 10 and 11 show the effect of dynamic range improvement in FIGS. 6, 7, 8(a), 8(b), 9(a), and 9(b).

As shown in FIGS. 10 and 11, because the bright area of the input image (DS1 in FIG. 10) before correction is a high-luminance area, the captured image is distributed over high luminance levels. Because the dark area HD1 of the input image before correction is a low-luminance area, the captured image is distributed over low luminance levels.

As shown in FIGS. 10 and 11, when the input image is corrected, in the bright area DS1, because the correction gain is small, the signal indicated by the dash-dot-dot line distributed over the high luminance levels of area DS2 becomes the signal indicated by the solid line in area DS2, with little change. The signal indicated by the dash-dot-dot line distributed over the low luminance levels of area HD1 becomes the signal indicated by the solid line in area HD2, with considerable change.

This indicates that when the correction is carried out by equation (B3), contrast is improved at both low luminance and high luminance, black collapse at low levels is dispelled, and the low-luminance signal is shifted considerably in the high-luminance direction, so an image is obtained with good visibility and clarity, and an improved dynamic range. Furthermore, when the correction is carried out, the average luminance becomes more centrally distributed, so that the image quality can be improved even with a display device with a narrow dynamic range (a liquid crystal display, for example).

In the imaging apparatus according to Embodiment B1, since the dynamic range of the pixel to be corrected is corrected on the basis of the luminance distribution of the pixel to be corrected and its neighboring pixels, the application timing of the result of the analysis can be greatly shortened, and the dynamic range of the input image can be appropriately improved.

In the imaging apparatus according to Embodiment B1, a pixel by pixel dynamic range expansion can be achieved without the use of an external frame memory, and there is no need for complex calculations, so the calculations and processing can be simplified, the structure can be simplified, and consequently, the cost can be reduced.

As described above, in Embodiment B1, the exposure control means 110 generates the corrected imaging signal Xb by correcting the exposure value (generating the second exposure value from the first exposure value) in accordance with the maximum value of the correction gain $G_k$ (maximum correction gain Gmax), calculating the correction gain $G_k$ for each pixel based on the average luminance Yavg of the neighboring pixels and on the luminance component of the imaging signal Xa output from the camera signal processing means 108 when the corrected exposure value (the second exposure value) is used, and multiplying the imaging signal Xa by the correction gain $G_k$. The maximum correction gain Gmax may be determined from an average luminance of the dark areas in the image as above, or it may have a predetermined value.

Figure 36:
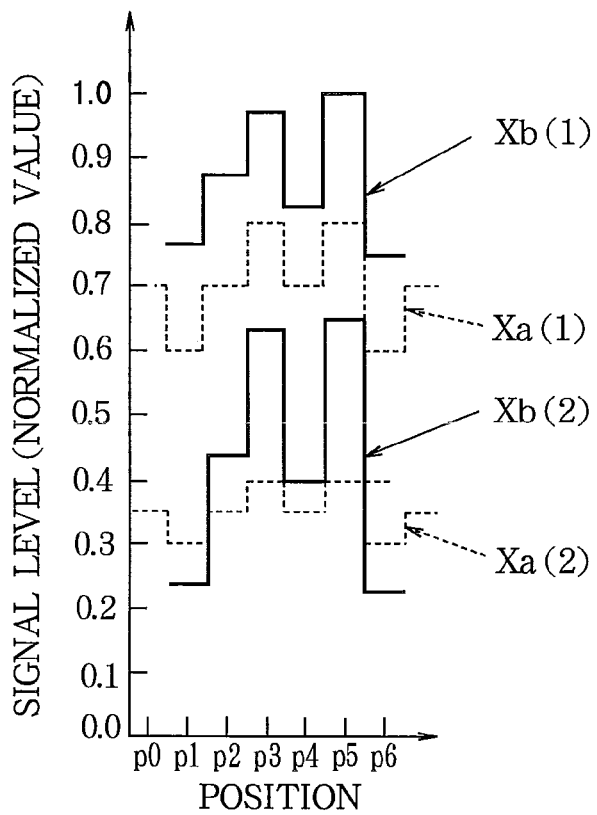
FIG. 36 is a graph showing an imaging signal obtained with the first exposure value and an image signal obtained with the second exposure value.

FIG. 36 is a graph showing the effects of exposure correction (using the second exposure value E2 instead of the first exposure value E1) and gain correction.

The symbol Xa(1) represents the imaging signal Xa output from the camera signal processing means 108 when an image is captured at the first exposure value E1; the symbol Xb(1) represents the imaging signal Xb (output of the gain correction means 102) corresponding to imaging signal Xa(1) after gain correction.

The symbol Xa(2) represents the imaging signal Xa output from the camera signal processing means 108 when an image is captured at the second exposure value, which is one half of the first exposure value; symbol Xb(2) represents the imaging signal Xb (output of the gain correction means 102) corresponding to imaging signal Xa(2) after gain correction.

In this case, the second exposure value E2 is assumed to be half the first exposure value E1.

When gain correction is carried out on the signal Xa(1) obtained at the first exposure value E1, the gain correction is 1.2; when gain correction is carried out using the second exposure value E2, contrast is improved by doubling the correction gain $G_k$.

As shown at pixel position (p5), when the first exposure value E1 is used, the bright area may undergo white collapse, lowering the contrast in that area. Such white collapse can be avoided by use of the second exposure value E2.

Imaging with the second exposure value E2 and performing gain correction in this way controls the exposure so that white collapse is suppressed in images in which white collapse would conventionally have occurred. Exposure control enables the signal shifted toward the black end to be amplified by gain correction. The contrast, image quality, and visibility can be improved for both bright signals in bright areas and dark signals in dark areas.

Embodiment B2

Figure 37:
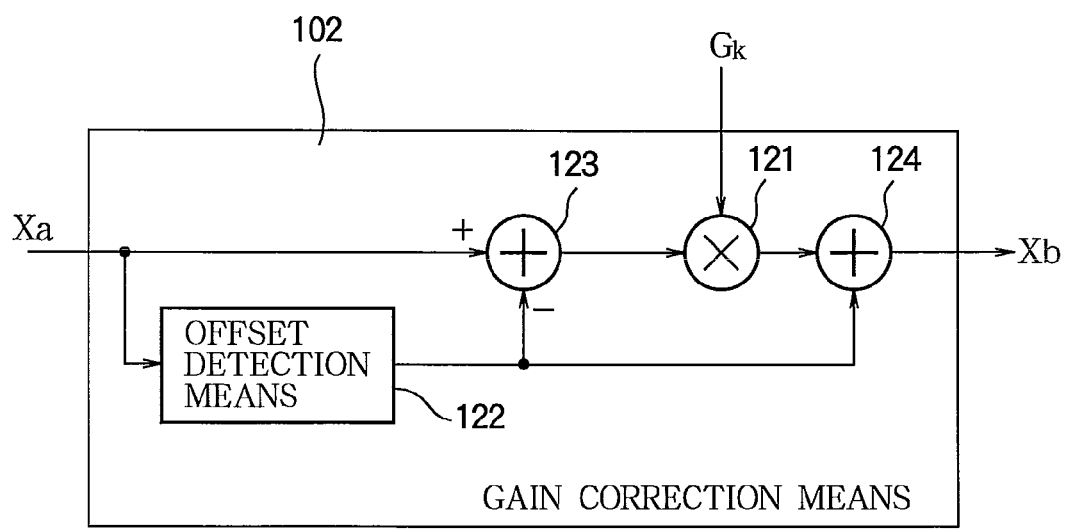
FIG. 37 is a block diagram showing an example of the gain correction means used in an imaging apparatus according to Embodiment B2 of the invention (a device for implementing an image processing method according to Embodiment B2).

FIG. 37 is a block diagram showing an example of the gain correction means 102 used in an imaging apparatus according to Embodiment B2 of the invention (a device for implementing an image processing method according to Embodiment B2). The gain correction means 102 according to Embodiment B2 comprises an offset detection means 122, an offset subtraction means 123, a multiplying means 121 and an offset addition means 124. Except for the gain correction means 102, the configuration of the imaging apparatus according to Embodiment B2 is same as shown in FIG. 20 in Embodiment B1.

The gain correction means 102 in Embodiment B2 has means for adjusting the offset of the luminance signal (input luminance signal) Xin of the imaging signal Xa before gain correction.

Offset refers to the degree of black offset of the signal level due to the imaging environment and conditions of the subject such as when the imaging element is shooting into the light, or when the image is affected by flare of the lens (not shown) of the imaging apparatus.

The correction operation when the offset adjustment is performed will now be described in detail. The offset detection means 122 obtains an offset quantity indicating the degree of black offset of the input image by detecting the minimum signal of the imaging signal Xa before correction. The offset quantity Offset can be obtained from the following equation (B8).

$$\text{Offset} = P \times \text{MIN}(R, G, B) \tag{B8}$$

MIN(R, G, B) indicates the minimum value of the input image RGB signal, and P is a real number satisfying $0 \leq P \leq 1$. The offset quantity Offset can be detected automatically by detecting the minimum value MIN(R, G, B) of the R, G, and B signals of the image on one screen one or more frames before, valid for performing the correction.

FIG. 37 shows a configuration in which the offset quantity Offset is detected automatically from the imaging signal Xa by the offset detection means 122, but a configuration in which the offset quantity Offset is input from an external device may also be used. In an external device, the performance of the external device can be improved by improving the correction gain for the signal of the object to which the correction is to be applied. More specifically, the external device has functions for carrying out advanced image processing such as biometric authentication of fingerprints, veins, faces, etc. or shape authentication or character recognition, detecting the feature points of the subject (the face, for face authentication), and performing authentication on the basis of the detection result. In the external device, by determining and setting the offset quantity Offset from the area including the feature points and the signal level detection result in that area, it is possible to emphasize the signal at the feature points. Because the signal level of the feature points is increased, it is also possible to improve the performance of the external device regarding detection accuracy, authentication rate, etc.

The offset subtraction means 123 subtracts the offset quantity Offset determined by the offset detection means 122 from the input R signal Ra(M, N) at coordinates (M, N), the input G signal Ga(M, N) at coordinates (M, N), and the input B signal Ba(M, N) at coordinates (M, N), and outputs Ra(M,N)−Offset, Ga(M,N)−Offset, and Ba(M,N)−Offset.

The multiplying means 121 multiplies the signals from which the offset quantity Offset has been subtracted, as output from the offset subtraction means 123, by the correction gain $G_k$ obtained from the correction gain calculation means 104, and outputs $G_k \times (\text{Ra}(M,N) - \text{Offset})$, $G_k \times (\text{Ga}(M,N) - \text{Offset})$, and $G_k \times (\text{Ba}(M,N) - \text{Offset})$.

The offset addition means 124 receives the product signal from the multiplying means 121, adds the same offset quantity Offset as used in the offset subtraction means 123, and outputs $$G_k \times (Ra(M,N) - \text{Offset}) + \text{Offset},$$

$$G_k \times (Ga(M,N) - \text{Offset}) + \text{Offset}, \text{ and}$$

$$G_k \times (Ba(M,N) - \text{Offset}) + \text{Offset}.$$

The operation of the offset subtraction means 123, multiplying means 121, and offset addition means 124 is expressed by the following equations (B9a), (B9b), (B9c).

$$Rb(M,N) = G_k \times (Ra(M,N) - \text{Offset}) + \text{Offset} \quad \text{(B9a)}$$

$$Gb(M,N) = G_k \times (Ga(M,N) - \text{Offset}) + \text{Offset} \quad \text{(B9b)}$$

$$Bb(M,N) = G_k \times (Ba(M,N) - \text{Offset}) + \text{Offset} \quad \text{(B9c)}$$

When offset correction is not carried out, the correction gain $G_k$ amplifies the offset quantity Offset, decreasing the correction gain applied to the signal the contrast of which is to be improved, converting it to a signal lacking in allover contrast. If an offset correction is carried out, the correction gain applied to the signal the contrast of which is to be improved can be increased, so the operation can be carried out with higher contrast.

The offset quantity (second offset quantity) added by the offset addition means 124 may have a value lower than the offset quantity (first offset quantity) subtracted by the offset subtraction means 123. For example, the Offset1 added at the offset addition means 124 may be calculated as follows.

$$\text{Offset1} = Q \times \text{Offset}.$$

$$(0 \leq Q \leq 1)$$

Making the offset quantity (Offset1) used in the integration means 111 less than the offset quantity (Offset) used in the exposure control means 110 has the effect of reducing the black offset. In the offset corrected signal, that is, in addition to the prevention of black collapse, the offset quantity Offset1 corrects the black offset before the offset correction, thereby enabling improvement of the quality of an unclear image with an uncrisp black signal. That is, an image having crisp black levels is obtained. The operation when the offset quantity (Offset1) used in the integration means 111 is less than the offset quantity (Offset) used in the exposure control means 110 is expressed by the following equations (B10a), (B10b), (B10c), and (B10d).

$$Rb(M,N) = G_k \times (Ra(M,N) - \text{Offset}) + \text{Offset1} \quad \text{(B10a)}$$

$$Gb(M,N) = G_k \times (Ga(M,N) - \text{Offset}) + \text{Offset1} \quad \text{(B10b)}$$

$$Bb(M,N) = G_k \times (Ba(M,N) - \text{Offset}) + \text{Offset1} \quad \text{(B10c)}$$

$$\text{Offset1} = Q \times \text{Offset} \quad \text{(B10d)}$$

In regard to points other than the above, Embodiment B2 is identical to Embodiment B1.

The offset addition means 112 according to Embodiment B2 enables the detection of the amount of offset of an image, and accordingly the improvement of the image quality by an offset correction based on the detected offset quantity to improve the contrast among signals distributed in lower luminance areas.

In the imaging apparatus according to Embodiment B2, the offset quantity subtracted before the gain correction multiplication process may differ from the offset quantity added after the gain correction multiplication process; this can improve the crispness of the black signal, thereby improving the image quality.

Embodiment B3

In Embodiments B1 and B2, the correction gain calculation means 104 may be identical to the correction gain calculation means 3 described in Embodiment A3. Although it can be used in the imaging apparatus in Embodiments B1 and B2, however, in this case, the Gmin in the equation (A10) in the description of Embodiment A3 indicates the minimum gain by which the uncorrected imaging signal Xa is multiplied when it has its maximum value. In this case, an effect similar to that described in Embodiment A3 can be obtained.

Embodiment B4

As the filter means 132 in the imaging apparatus according to Embodiment B1, B2, or B3, a nonlinear filter such as an epsilon filter (ε-filter) may be used as described in Embodiment A4. An effect similar to that obtained in Embodiment A4 can thereby be obtained.

What is claimed is:

1. An image processing apparatus for correcting an input image signal pixel by pixel to generate a corrected image signal, comprising:
   a filter unit for determining and outputting a luminance distribution of a pixel to be corrected and pixels neighboring the pixel to be corrected;
   a correction gain calculation unit for determining a correction gain of the pixel to be corrected from the output of the filter unit; and
   an operation unit for performing an operation on the input image signal pixel by pixel using the correction gain determined by the correction gain calculation unit; wherein
   the output of the filter unit is an average luminance of the pixel to be corrected and pixels neighboring the pixel to be corrected;
   the operation performed by the operation unit is multiplication; and
   the correction gain calculation unit calculates the correction gain so that the average luminance multiplied by the correction gain is a monotonically increasing function with respect to the average luminance, and the correction gain becomes small when the average luminance is large, and the correction gain becomes large when the average luminance is small.

2. The image processing apparatus of claim 1, wherein
   if the output of the filter unit is Yavg,
   the maximum value of the output of the filter unit is Ymax,
   the correction gain is $G_k$, and
   the maximum value of the correction gain is Gmax, the following condition is satisfied:

$$G_k = \frac{Gmax}{1 + (Gmax - 1) \times \frac{Yavg}{Ymax}}.$$

3. The image processing apparatus of claim 1, wherein
   if the output of the filter unit is Yavg,
   the maximum value of the output of the filter unit is Ymax,
   the correction gain is $G_k$,
   the maximum value of the correction gain is Gmax, and the minimum value of the correction gain is Gmin, the following condition is satisfied:

$$G_k = \frac{Gmax}{1 + \left(\frac{Gmax}{Gmin} - 1\right) \times \frac{Yavg}{Ymax}}.$$

4. The image processing apparatus of claim 1, further comprising:
- an offset detection unit for detecting, from the input image signal, a first offset quantity indicating a degree of black offset of the input image;
- an offset subtraction unit for subtracting the first offset from the input image signal; and
- an offset addition unit for adding a second offset quantity equal to or less than the first offset quantity to the output of the operation unit; wherein
the operation performed by the operation unit is performed on the output of the offset subtraction unit.

5. An image processing method for correcting an input image signal pixel by pixel to generate a corrected image signal, an image processing method comprising:
- a step of determining a luminance distribution of a pixel to be corrected and pixels neighboring the pixel to be corrected;
- a step of determining a correction gain of the pixel to be corrected from said luminance distribution; and
- a step of performing an operation on the input image signal pixel by pixel, using the determined correction gain; wherein
the luminance distribution in the step of determining a luminance distribution is an average luminance of the pixel to be corrected and pixels neighboring the pixel to be corrected;
the operation performed in the step of using the determined correction gain to perform an operation is multiplication; and
the correction gain in the step of determining a correction gain is calculated so that the average luminance multiplied by the correction gain is a monotonically increasing function with respect to the average luminance, the correction gain becomes small when the average luminance is large, and the correction gain becomes large when the average luminance is small.

* * * * *